United States Patent
Okimoto et al.

(10) Patent No.: US 11,175,658 B2
(45) Date of Patent: Nov. 16, 2021

(54) VEHICLE CONTROL SYSTEM, VEHICLE CONTROL METHOD, AND VEHICLE CONTROL PROGRAM

(71) Applicant: HONDA MOTOR CO., LTD., Tokyo (JP)

(72) Inventors: Kohei Okimoto, Wako (JP); Yoshitaka Mimura, Wako (JP); Naotaka Kumakiri, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 355 days.

(21) Appl. No.: 16/082,955

(22) PCT Filed: Mar. 16, 2016

(86) PCT No.: PCT/JP2016/058372
§ 371 (c)(1),
(2) Date: Sep. 7, 2018

(87) PCT Pub. No.: WO2017/158771
PCT Pub. Date: Sep. 21, 2017

(65) Prior Publication Data
US 2019/0033860 A1   Jan. 31, 2019

(51) Int. Cl.
*G05D 1/00* (2006.01)
*B60H 1/00* (2006.01)
*B60Q 3/80* (2017.01)

(52) U.S. Cl.
CPC ....... *G05D 1/0061* (2013.01); *B60H 1/00764* (2013.01); *B60H 1/00964* (2013.01);
(Continued)

(58) Field of Classification Search
CPC .. B60H 1/00764; B60H 1/00964; B60Q 3/80; G05D 1/0061; G05D 1/0088; G05D 2201/0213
(Continued)

(56) References Cited

U.S. PATENT DOCUMENTS 9,342,074 B2 *   5/2016   Dolgov ............... G05D 1/0061
9,884,631 B2 *   2/2018   James ................... B60W 50/14
(Continued)

FOREIGN PATENT DOCUMENTS

CN   103781663   5/2014
JP   60-164447   10/1985
(Continued)

OTHER PUBLICATIONS

Japanese Office Action for Japanese Patent Application No. 2018-505146 dated Sep. 3, 2019.
(Continued)

*Primary Examiner* — Joshua E Rodden
(74) *Attorney, Agent, or Firm* — Amin, Turocy & Watson, LLP

(57) ABSTRACT

A vehicle control system includes an automatic driving control unit executing a first driving mode in which at least one of acceleration/deceleration and steering of a subject vehicle is automatically controlled and an environment control unit controlling an environment device of the subject vehicle such that an environment of the inside of a vehicle cabin is in a state appropriate for a second driving mode in a case in which the automatic driving control unit ends execution of the first driving mode and transitions to a second driving mode of which a degree of automatic driving is lower than that of the first driving mode.

6 Claims, 18 Drawing Sheets

(52) U.S. Cl.
CPC ............. B60Q 3/80 (2017.02); G05D 1/0088 (2013.01); G05D 2201/0213 (2013.01)

(58) Field of Classification Search
USPC .......................................................... 701/23
See application file for complete search history.

(56) References Cited

U.S. PATENT DOCUMENTS

| | | | | |
|---|---|---|---|---|
| 2011/0187518 | A1* | 8/2011 | Strumolo | B62D 15/029 340/438 |
| 2011/0241862 | A1* | 10/2011 | Debouk | B60W 50/035 340/439 |
| 2013/0131907 | A1* | 5/2013 | Green | G05D 1/0055 701/23 |
| 2015/0241878 | A1* | 8/2015 | Crombez | B60W 30/12 701/23 |
| 2016/0355192 | A1* | 12/2016 | James | B60R 11/04 |
| 2018/0056851 | A1* | 3/2018 | Kim | G05D 1/0061 |
| 2019/0025823 | A1* | 1/2019 | Christiansen | B62D 15/029 |
| 2019/0049954 | A1* | 2/2019 | Mitchell | G05D 1/0297 |

FOREIGN PATENT DOCUMENTS

| | | |
|---|---|---|
| JP | 09-161196 | 6/1997 |
| JP | 2000-276690 | 10/2000 |
| JP | 2001-199295 | 7/2001 |
| JP | 2007-021019 | 2/2007 |
| JP | 2010-000951 | 1/2010 |
| JP | 2015-217798 | 12/2015 |

OTHER PUBLICATIONS

Chinese Office Action for Chinese Patent Application No. 201680083407.2 dated Nov. 20, 2020.
International Search Report and Written Opinion for International Patent Application No. PCT/JP2016/058372 dated Jun. 21, 2016, 11 pages.

* cited by examiner

VEHICLE CONTROL SYSTEM, VEHICLE CONTROL METHOD, AND VEHICLE CONTROL PROGRAM

TECHNICAL FIELD

Embodiments of the present invention relate to a vehicle control system, a vehicle control method, and a vehicle control program.

BACKGROUND ART

In recent years, technologies for automatically controlling at least one of acceleration/deceleration and steering of a subject vehicle (hereinafter, referred to as "automatic driving") have been researched. In relation with this, technologies for detecting approach of a vehicle to a point at which switching from automatic driving to manual driving is planned to be performed, determining a timing at which a switching means is to be operated on the basis of a predetermined transition time required before switching from automatic driving to manual driving is completed, and prompting a driver to operate the switching means on the basis of the determined timing have been disclosed (for example, see Patent Literature 1).

CITATION LIST

Patent Literature

[Patent Literature 1]
Japanese Unexamined Patent Application, First Publication No. H 9-161196

SUMMARY OF INVENTION

Technical Problem

However, in a conventional technique, in a case in which automatic driving is completed, or the degree of automatic driving is lowered, the in-vehicle environment is not considered.

The present invention is in view of such situations, and one object thereof is to provide a vehicle control system, a vehicle control method, and a vehicle control program capable of realizing a smooth transition from a driving mode for performing automatic driving to a driving mode of which a degree of automatic driving is further low.

Solution to Problem (1): According to an aspect of the present invention, there is provided a vehicle control system (100) including: an automatic driving control unit (120) executing a first driving mode in which at least one of acceleration/deceleration and steering of a subject vehicle is automatically controlled; and an environment control unit (170) controlling an environment device (70) of the subject vehicle such that an environment of the subject vehicle is in a state appropriate for a second driving mode in a case in which the automatic driving control unit (120) ends execution of the first driving mode and transitions to a second driving mode of which a degree of automatic driving is lower than that of the first driving mode.

(2): In the above-described aspect (1), the first driving mode is a mode in which a vehicle occupant does not need to monitor a vicinity of the subject vehicle, and the second driving mode is a mode in which a vehicle occupant needs to monitor the vicinity of the subject vehicle.

(3): In the above-described aspect (1) or (2), in a case in which the automatic driving control unit ends execution of the first driving mode at a planned end point of the first driving mode and transitions to the second driving mode of which the degree of automatic driving is lower than that of the first driving mode, the environment control unit starts control of the environment device of the subject vehicle at a timing that is before a timing at which the subject vehicle reaches the planned end point such that an environment of the subject vehicle is in a state appropriate for the second driving mode at the planned end point.

(4): In any one of the above-described aspects (1) to (3), the environment device includes a device inside a vehicle cabin, and, in a case in which the automatic driving control unit ends execution of the first driving mode and transitions to the second driving mode, the environment control unit controls the device inside the vehicle cabin.

(5): In the above-described aspect (3), the environment device includes a lighting device inside the vehicle cabin, and, in a case in which the automatic driving control unit ends execution of the first driving mode and transitions to the second driving mode, the environment control unit decreases the amount of light emission of the lighting device to a reference value or less in a case in which an illuminance outside the subject vehicle is equal to or less than a threshold.

(6): In the above-described aspect (5), the environment control unit decreases the amount of light emission of the lighting device inside the vehicle cabin to the reference value or less at a timing that is before a time point at which the automatic driving control unit ends execution of the first driving mode and transitions to the second driving mode.

(7): In the above-described aspect (5), the environment control unit decreases the amount of light emission of the lighting device to the reference value or less by gradually decreasing the amount of light emission of the lighting device inside the vehicle cabin from an amount of light emission that is higher than the reference value.

(8): In the above-described aspect (5), the environment control unit temporarily increases the amount of light emission of the lighting device before decreasing the amount of light emission of the lighting device to the reference value or less.

(9): In the above-described aspect (1), the environment control unit causes the lighting device to emit light having a larger blue wavelength component in a case in which the automatic driving control unit ends execution of the first driving mode and transitions to the second driving mode than in a case other than the case in which the automatic driving control unit ends execution of the first driving mode and transitions to the second driving mode.

(10): In the above-described aspect (5), the environment control unit causes at least a change in the amount of light emission immediately after start of a decrease when the amount of light emission of the lighting device is decreased to the reference value to become gentler as an elapsed time from a time when the amount of light emission of the lighting device inside the vehicle cabin is changed as being higher than the reference value becomes longer.

(11): In the above-described aspect (1), the environment device includes an air conditioner inside the vehicle cabin, the environment control unit estimates fogging of a window of the subject vehicle, and, in a case in which the automatic driving control unit ends execution of the first driving mode and transitions to the second driving mode, an operation of the air conditioner is started in a case in which fogging of the window is estimated.

(12): In the above-described aspect (1), the environment device includes a temperature adjusting unit that raises a temperature of a steering wheel inside the subject vehicle, and, in a case in which the automatic driving control unit ends execution of the first driving mode and transitions to the second driving mode of which a degree of automatic driving is lower than that of the first driving mode, the environment control unit causes the temperature of the steering wheel to approach a predetermined temperature by controlling the temperature adjusting unit.

(13): According to yet another aspect of the present invention, there is provided a vehicle control method using an in-vehicle computer. The vehicle control method includes: executing a first driving mode in which at least one of acceleration/deceleration and steering of a subject vehicle is automatically controlled; and controlling an environment device of the subject vehicle such that an environment of the subject vehicle is in a state appropriate for a second driving mode in a case in which execution of the first driving mode is ended, and a transition to a second driving mode of which a degree of automatic driving is lower than that of the first driving mode is made.

(14): According to still another aspect of the present invention, there is provided a program causing an in-vehicle computer to perform: executing a first driving mode in which at least one of acceleration/deceleration and steering of a subject vehicle is automatically controlled; and controlling an environment device of the subject vehicle such that an environment of the inside of a vehicle cabin is in a state appropriate for a second driving mode in a case in which execution of the first driving mode is ended, and a transition to a second driving mode of which a degree of automatic driving is lower than that of the first driving mode is made.

Advantageous Effects of Invention

According to the above-described aspect (1) to (14), in a case in which a transition to the second driving mode of which a degree of automatic driving is lower than that of the first driving mode is performed, the environment device is controlled such that the environment of the subject vehicle is in a state appropriate for the second driving mode, and accordingly, a smooth transition from a driving mode performing automatic driving to a driving mode of which a degree of automatic driving is lower than that of the driving mode described above can be realized.

According to the above-described aspect (2), the environment device can be controlled to be in a state that is appropriate for the second driving mode in which a vehicle occupant needs to monitor the vicinity of the subject vehicle, and a smooth transition to a state in which the vehicle occupant monitors the vicinity of the subject vehicle can be realized.

According to the above-described aspect (3), control of the environment device of the subject vehicle is started at a timing that is before a timing at which the subject vehicle reaches the planned end point of the first driving mode, and accordingly, an environment of the subject vehicle can be caused to approach a state appropriate for the second driving mode before a timing at which the subject vehicle reaches the planned end point of the first driving mode. Thus, according to the above-described aspect (3), a smoother transition from a driving mode performing automatic driving to a driving mode of which a degree of automatic driving is lower than that of the driving mode described above can be realized.

According to the above-described aspect (4), by controlling a device disposed inside the vehicle cabin, a smooth transition from a driving mode performing automatic driving to a driving mode of which a degree of automatic driving is lower than that of the driving mode described above can be realized.

According to the above-described aspect (5), in a case in which a transition to the second driving mode of which the degree of automatic driving is lower than that of the first driving mode is performed, the amount of light emission of the lighting device is decreased to a reference value or less in a case in which an illuminance outside the subject vehicle is equal to or less than a threshold, and accordingly, the amount of light emission of the vehicle indoor lighting device can be controlled to be in a state appropriate for the second driving mode, and a smooth transition to the second driving mode can be realized. In other words, according to the above-described aspect (5), the surrounding environments of the subject vehicle can be easily checked by a vehicle occupant in the second driving mode. In addition, according to the above-described aspect (5), labor of adjusting the amount of light emission of the lighting device for performing the second driving mode can be suppressed.

According to the above-described aspect (6), the amount of light emission of the lighting device inside the vehicle cabin is decreased to the reference value or less at a timing that is before a time point at which the execution of the first driving mode is ended, and a transition to the second driving mode is performed, and accordingly, the amount of light emission of the lighting device can be caused to approach a value appropriate for the second driving mode at a timing at which the transition to the second driving mode is performed.

According to the above-described aspect (7), the amount of light emission of the lighting device inside the vehicle cabin is gradually decreased, and accordingly, an uncomfortable feeling given to a vehicle occupant can be further suppressed than in a case in which the amount of light emission of the lighting device is steeply decreased.

According to the above-described aspects (8) to (9), even in a situation in which a vehicle occupant is not awake in a case in which a transition to the second driving mode is performed, the vehicle occupant can be prompted to be awake.

According to the above-described aspect (10), a change in the amount of light emission is caused to be gentler as an elapsed time from a time when the amount of light emission of the lighting device inside the vehicle cabin is changed as being higher than the reference value becomes longer, and accordingly, the amount of light emission of the lighting device can be decreased in consideration of a period in which a vehicle occupant adapts to darkness.

According to the above-described aspect (11), the operation of the air conditioner is started in a case in which fogging of the window is estimated, and accordingly, a smooth transition from a driving mode performing automatic driving to a driving mode of which a degree of automatic driving is lower than that of the driving mode described above can be realized.

According to the above-described aspect (12), the temperature of the steering wheel is caused to approach the predetermined temperature in a case in which a transition from the first driving mode to the second driving mode is performed, and accordingly, a smooth transition from a driving mode performing automatic driving to a driving mode of which a degree of automatic driving is lower than that of the driving mode described above can be realized.

Figure 12:
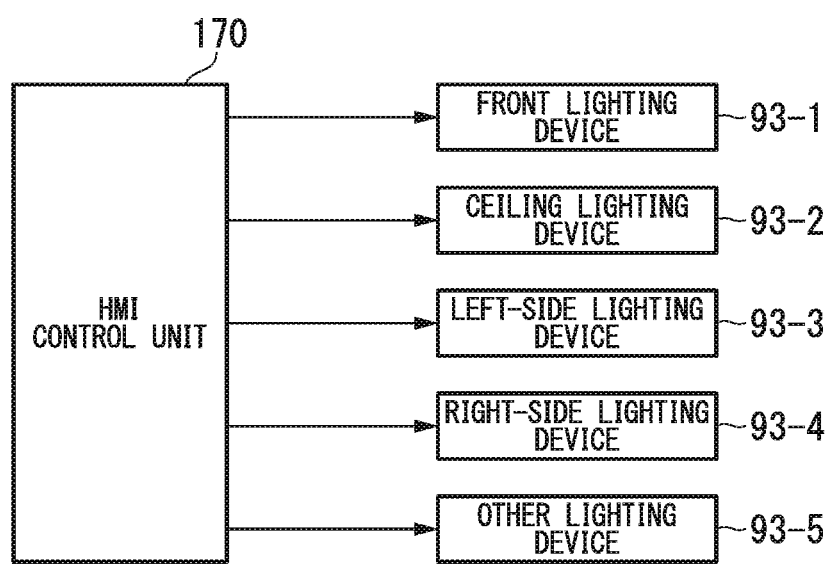

FIG. 12 is a diagram illustrating relations between a front lighting device 93-1, a ceiling lighting device 93-2, a left-side lighting device 93-3, a right-side lighting device 93-4, and other lighting devices 93-5 and an HMI control unit 170.

Figure 13:
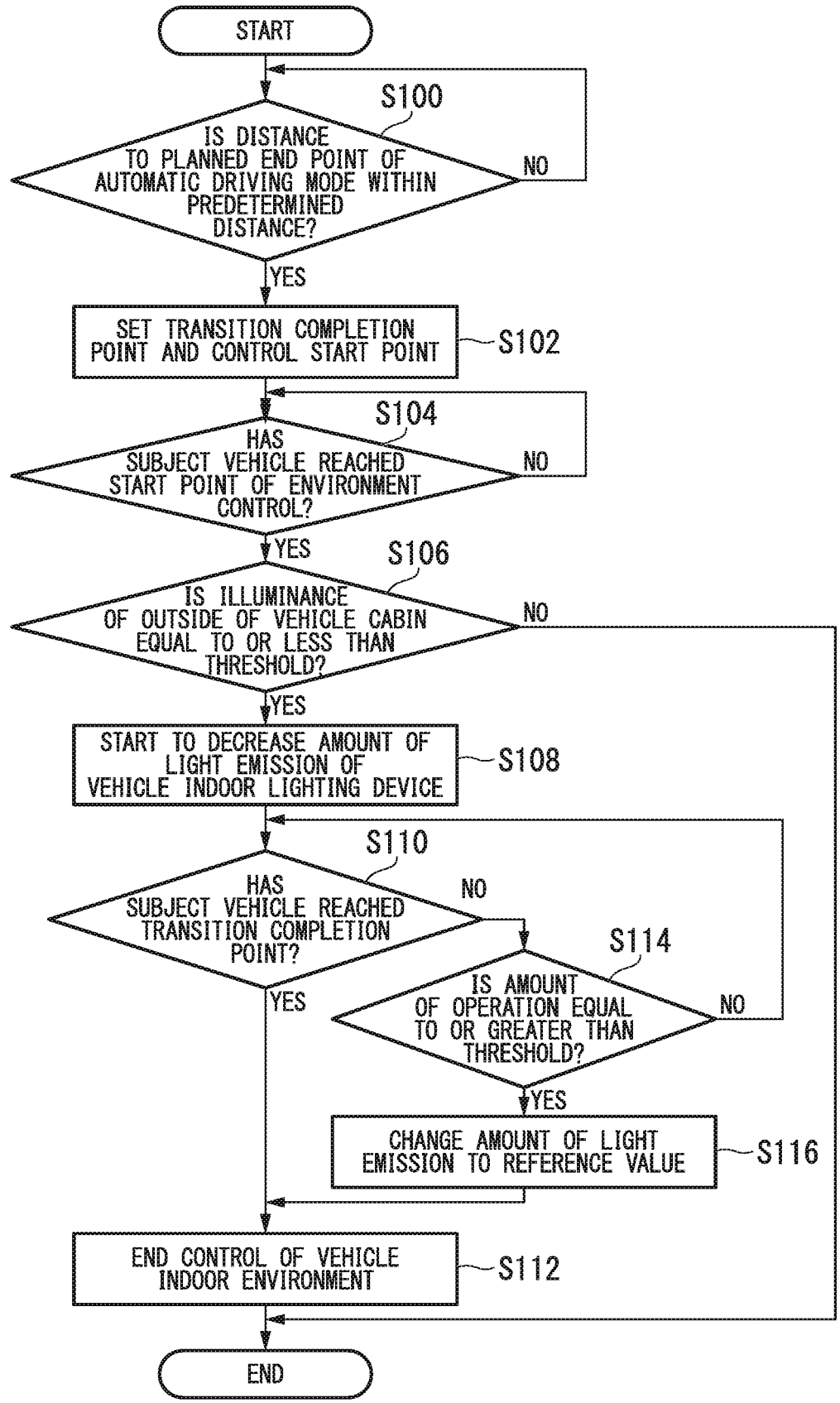

FIG. 13 is a flowchart illustrating one example of a process of controlling vehicle indoor lighting devices 93.

Figure 14:
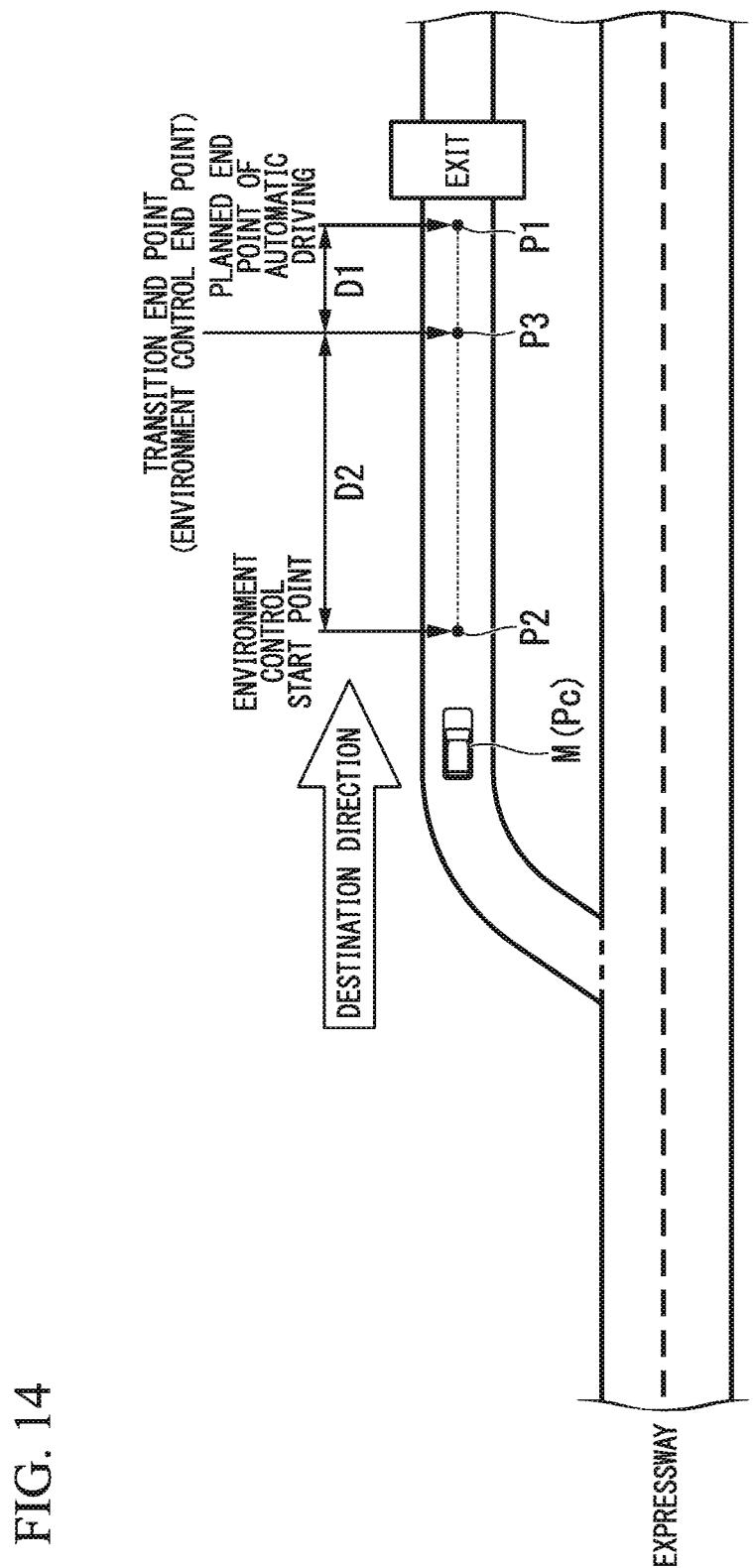

FIG. 14 is a diagram illustrating one example of relations between a start point P2 and an end point P3 of environment control and the position of the subject vehicle M according to this embodiment.

Figure 15:
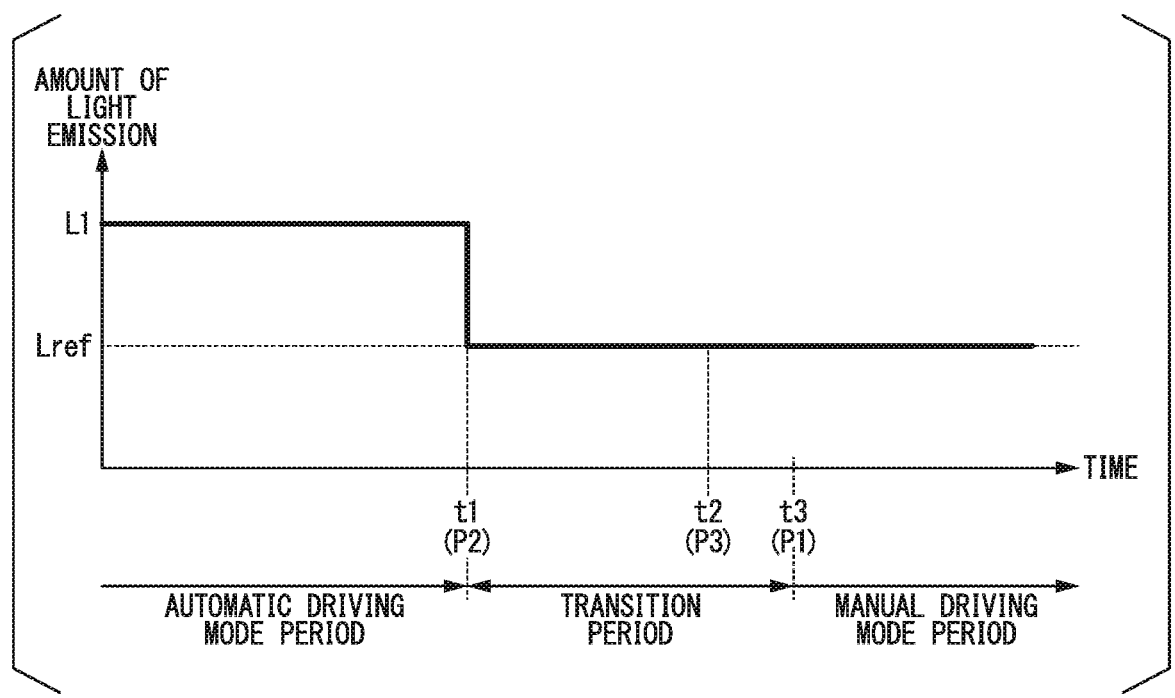

FIG. 15 is a diagram illustrating one example of changes in the amount of light emission of the vehicle indoor lighting device 93.

Figure 16:
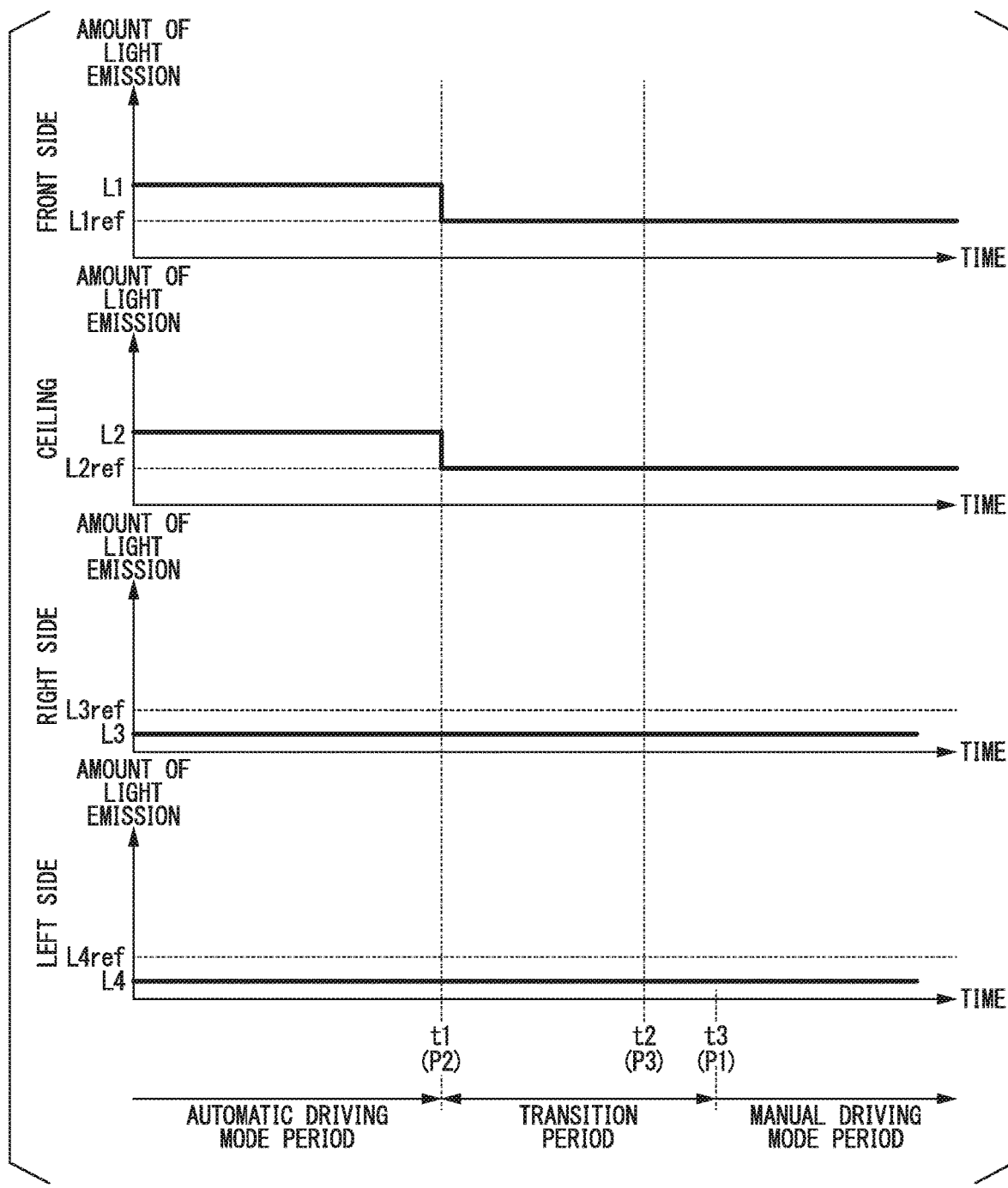

FIG. 16 is a diagram illustrating one example of changes in the amounts of light emission of a plurality of vehicle indoor lighting devices 93.

Figure 17:
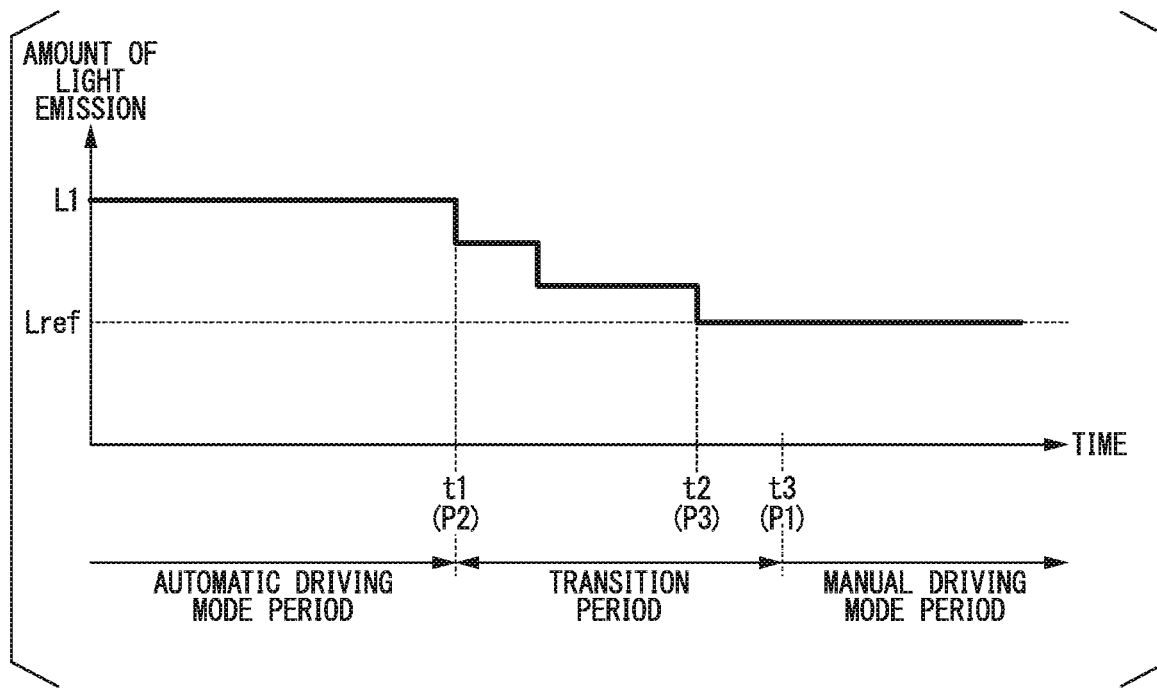

FIG. 17 is a diagram illustrating another example of changes in the amount of light emission of the vehicle indoor lighting device 93.

Figure 18:
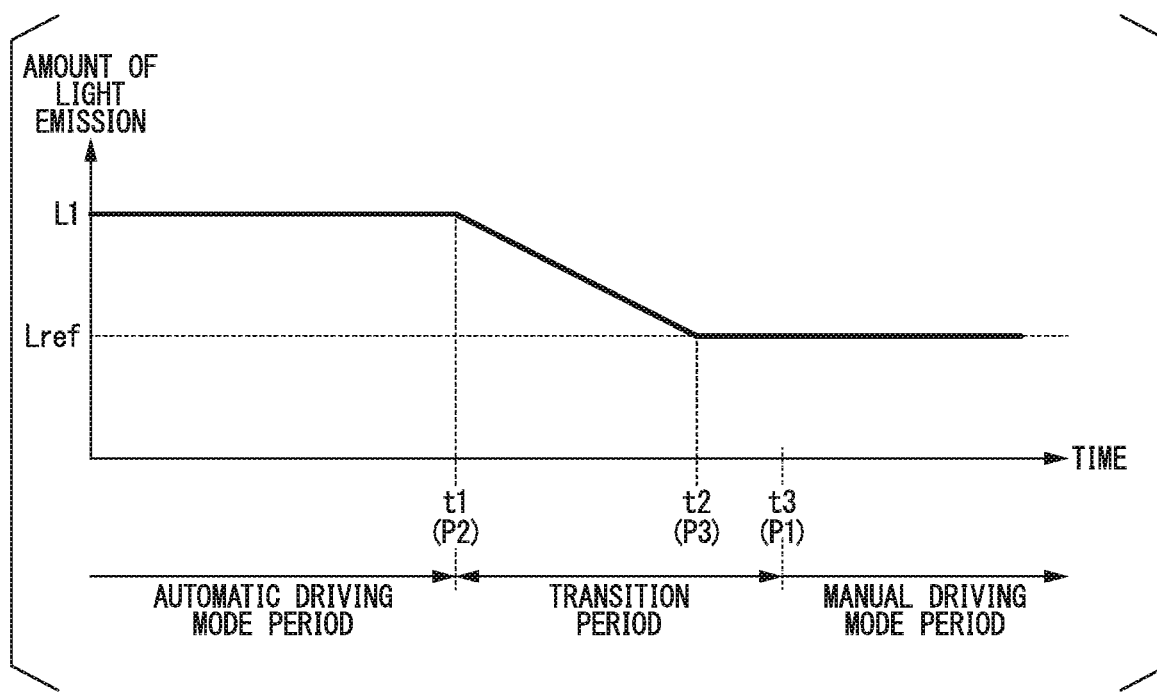

FIG. 18 is a diagram illustrating another example of changes in the amount of light emission of the vehicle indoor lighting device 93.

Figure 19:
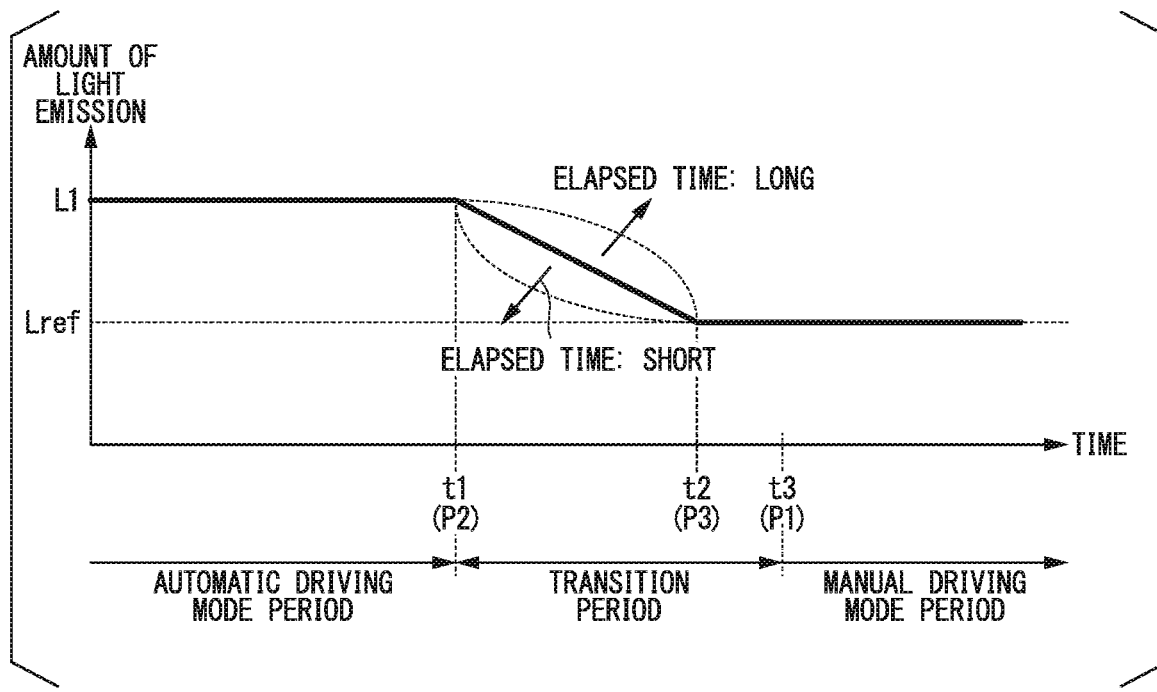

FIG. 19 is a diagram illustrating another example of changes in the amount of light emission of the vehicle indoor lighting device 93.

Figure 20:
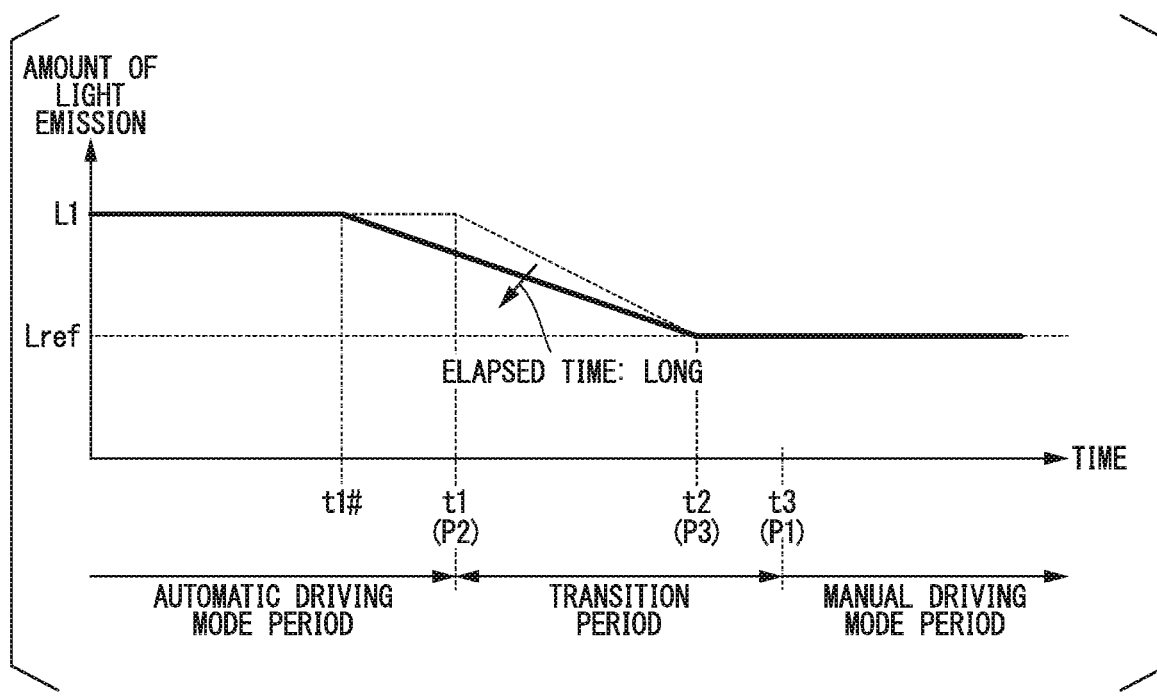

FIG. 20 is a diagram illustrating another example of changes in the amount of light emission of the vehicle indoor lighting device 93.

Figure 21:
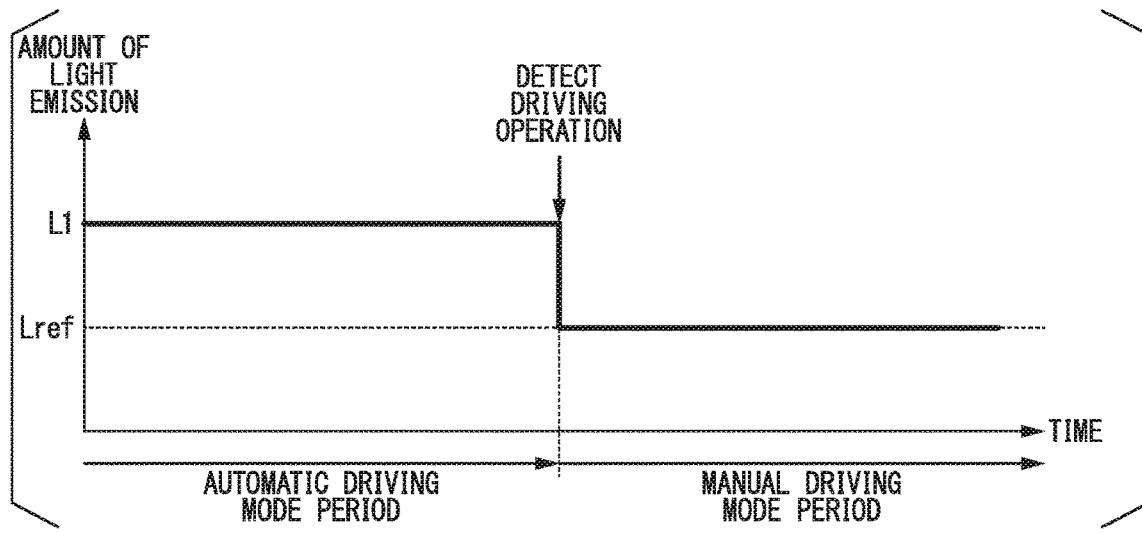

FIG. 21 is a diagram illustrating another example of changes in the amount of light emission of the vehicle indoor lighting device 93.

Figure 22:
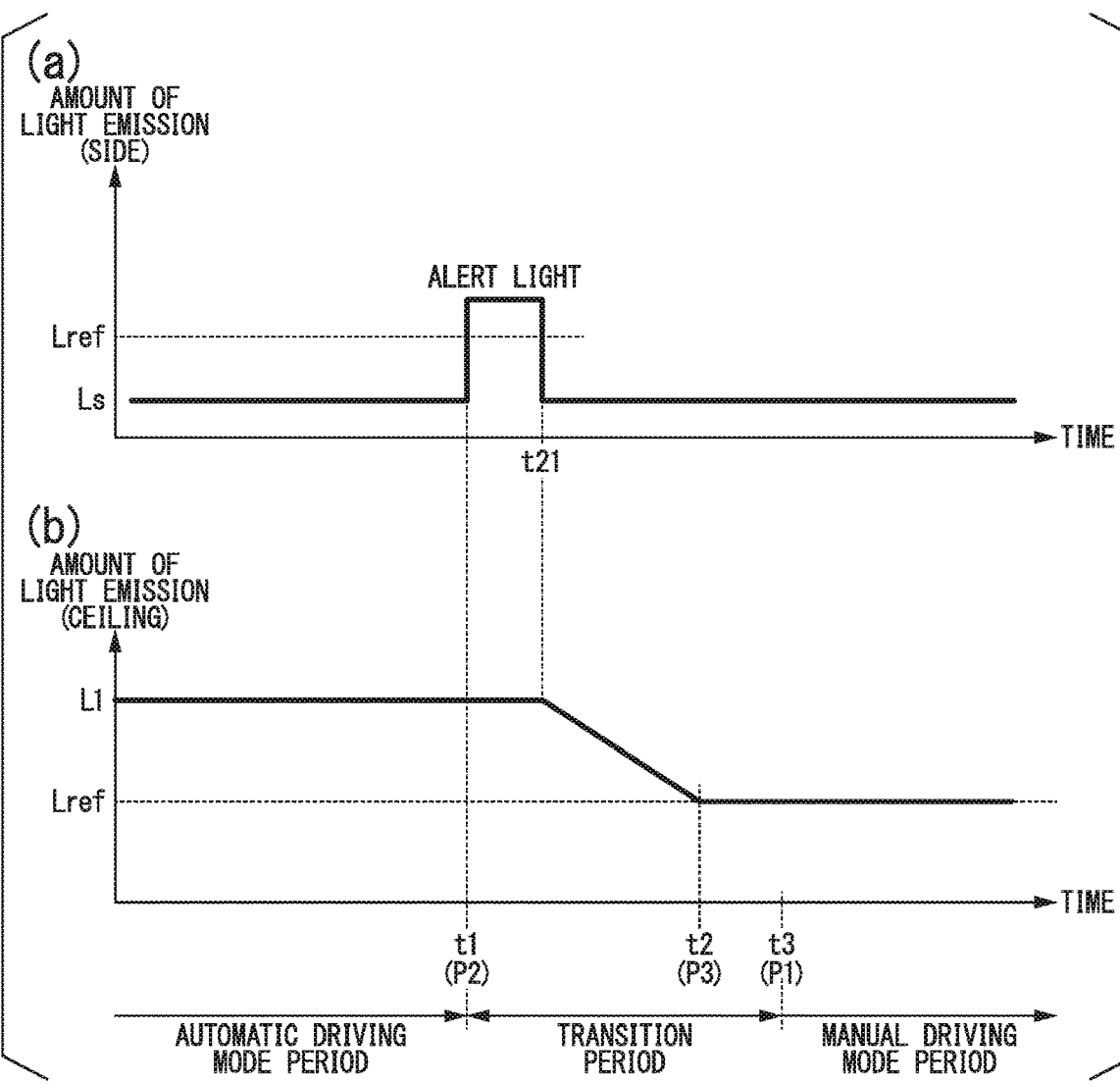

FIG. 22 is another example of changes in the amount of light emission of the vehicle indoor lighting device 93, (a) illustrates changes in the amounts of light emission of the left-side lighting device 93-3 and the right-side lighting device 93-4, and (b) illustrates changes in the amount of light emission of the ceiling lighting device 93-2.

Figure 23:
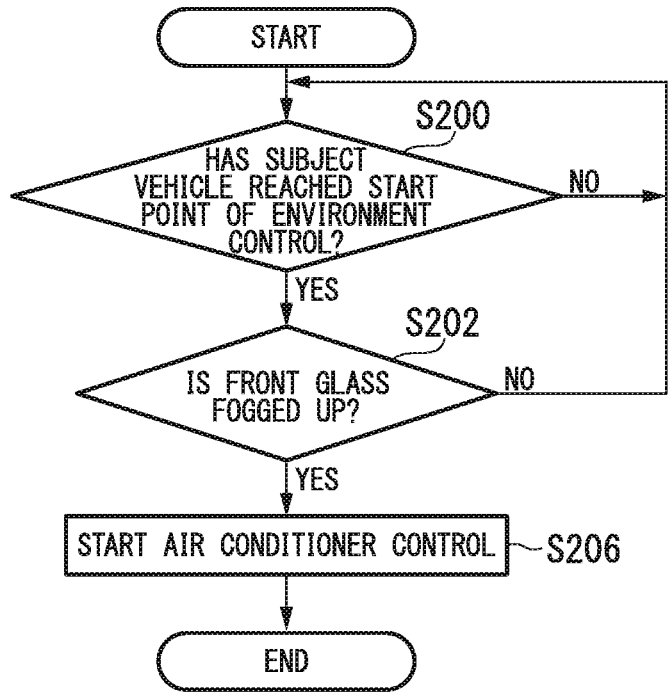

FIG. 23 is a flowchart illustrating one example of control of a vehicle indoor air conditioner 94.

Figure 24:
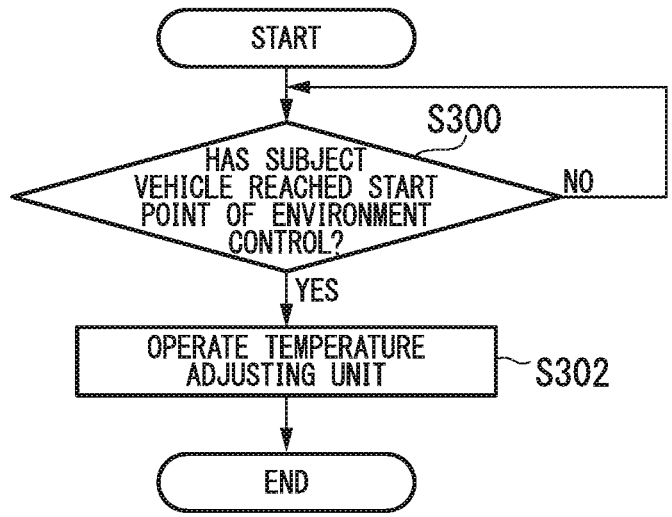

FIG. 24 is a flowchart illustrating one example of control of a temperature adjusting unit 78a.

Figure 25:
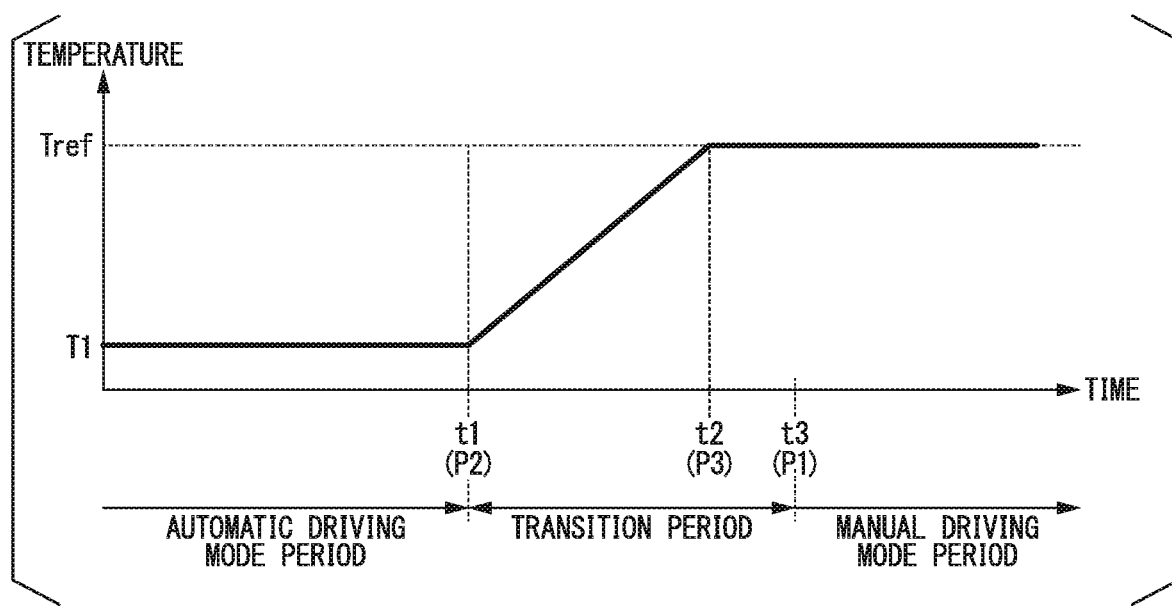

FIG. 25 is one example of temperature changes in a steering wheel 78.

DESCRIPTION OF EMBODIMENTS

Hereinafter, a vehicle control system, a vehicle control method, and a vehicle control program according to embodiments of the present invention will be described with reference to the drawings.

<Common Configuration>

Figure 1:
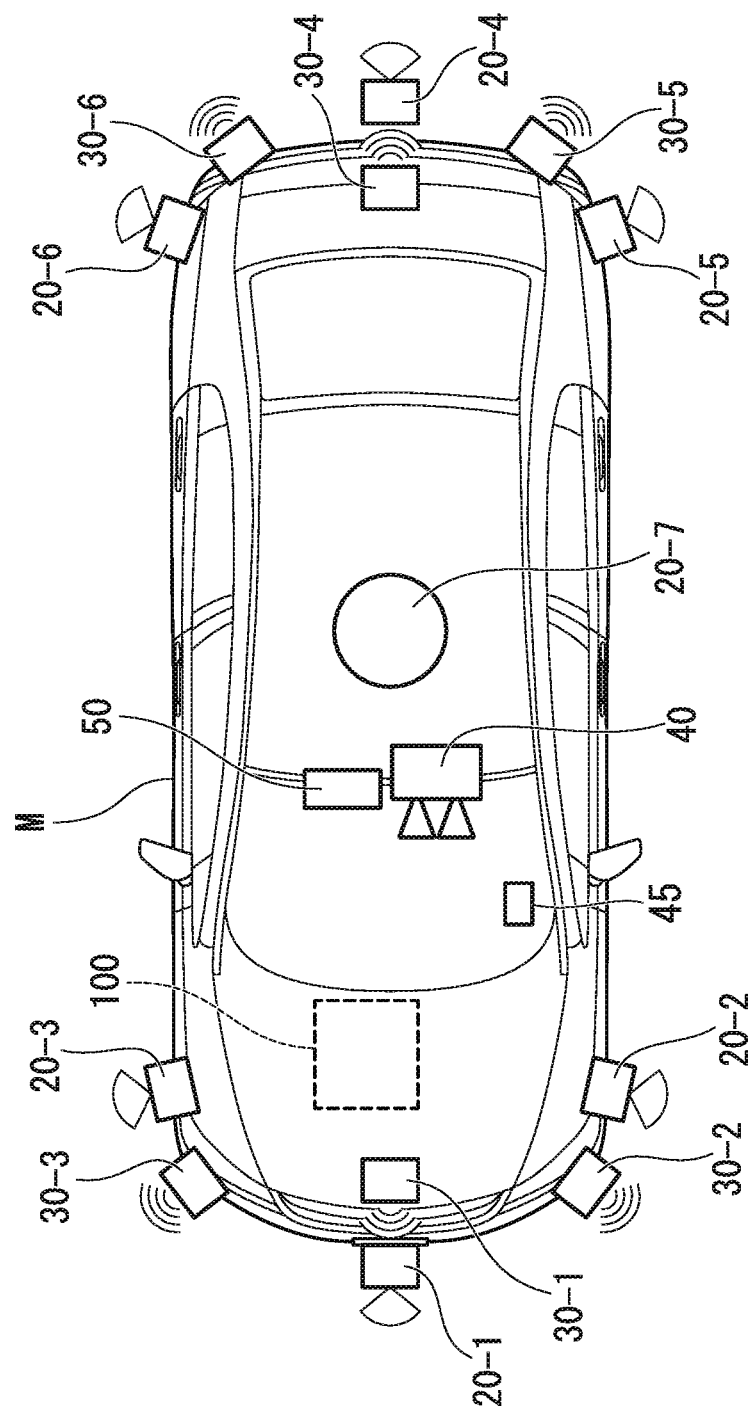
FIG. 1 is a diagram illustrating constituent elements of a subject vehicle M.

FIG. 1 is a diagram illustrating constituent elements of a vehicle (hereinafter referred to as a subject vehicle M) in which a vehicle control system 100 according to each embodiment is mounted. A vehicle in which the vehicle control system 100 is mounted, for example, is a vehicle with two wheels, three wheels, four wheels, or the like and includes an automobile having an internal combustion engine such as a diesel engine or a gasoline engine as its power source, an electric vehicle having a motor as its power source, a hybrid vehicle equipped with both an internal combustion engine and a motor, and the like. The electric vehicle described above, for example, is driven using electric power discharged by a cell such as a secondary cell, an alcohol fuel cell, a metal fuel cell, an alcohol fuel cell, or the like.

As illustrated in FIG. 1, sensors such as finders 20-1 to 20-7, radars 30-1 to 30-6, a camera 40, an illuminance sensor 45 and the like, a navigation device 50, and a vehicle control system 100 are mounted in the subject vehicle M.

Each of the finders 20-1 to 20-7 is a light detection and ranging or a laser imaging detection and ranging (LIDAR) device measuring a distance to a target by measuring scattered light from emitted light. For example, the finder 20-1 is mounted on a front grille or the like, and the finders 20-2 and 20-3 are mounted on side faces of a vehicle body, door mirrors, inside head lights, near side lights, or the like. The finder 20-4 is mounted in a trunk lid or the like, and the finders 20-5 and 20-6 are mounted on side faces of the vehicle body, inside tail lamps or the like. Each of the finders 20-1 to 20-6 described above, for example, has a detection area of about 150 degrees with respect to a horizontal direction. In addition, the finder 20-7 is mounted on a roof or the like. For example, the finder 20-7 has a detection area of 360 degrees with respect to a horizontal direction.

The radars 30-1 and 30-4, for example, are long-distance millimeter wave radars having a wider detection area in a depth direction than that of the other radars. In addition, the radars 30-2, 30-3, 30-5, and 30-6 are middle-distance millimeter wave radars having a narrower detection area in a depth direction than that of the radars 30-1 and 30-4.

Hereinafter, in a case in which the finders 20-1 to 20-7 are not particularly distinguished from each other, one thereof will be simply referred to as a "finder 20," and, in a case in which the radars 30-1 to 30-6 are not particularly distinguished from each other, one thereof will be simply referred to as a "radar 30." The radar 30, for example, detects an object using a frequency modulated continuous wave (FM-CW) system.

The camera 40, for example, is a digital camera using a solid-state imaging device such as a charge coupled device (CCD), a complementary metal oxide semiconductor (CMOS), or the like. The camera 40 is mounted in an upper part of a front windshield, a rear face of an interior mirror, or the like. The camera 40, for example, repeats imaging of the side in front of the subject vehicle M periodically. The camera 40 may be a stereo camera including a plurality of cameras.

The illuminance sensor 45, for example, includes a phototransistor, detects an illuminance outside of the subject vehicle M, and outputs the detected illuminance to the vehicle control system 100. The illuminance sensor 45 is mounted on an instrument panel or the like.

The configuration illustrated in FIG. 1 is merely one example, and a part of the configuration may be omitted, and other different components may be added.

First Embodiment

Figure 2:
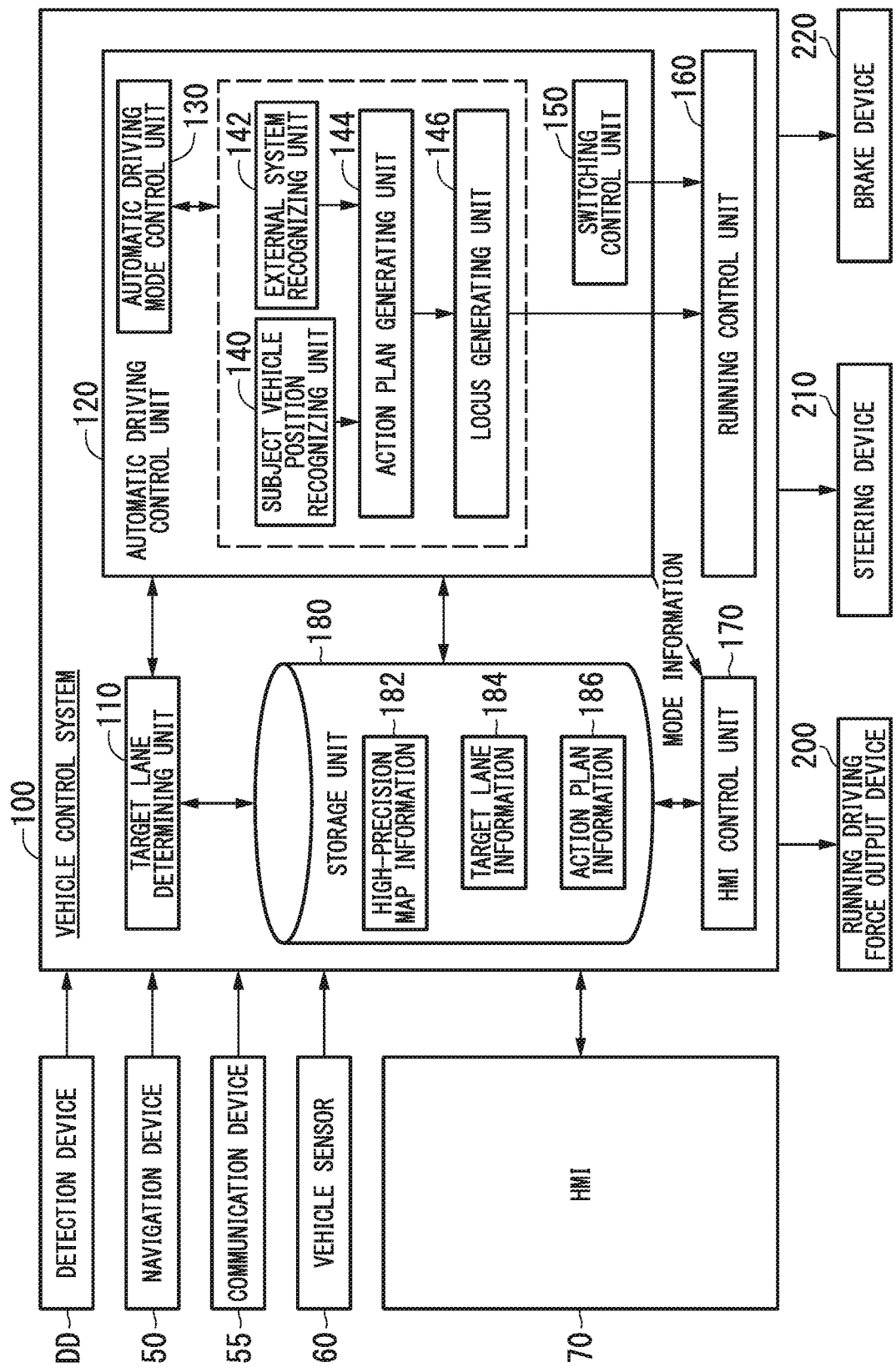
FIG. 2 is functional configuration diagram focusing on a vehicle control system 100 and is a functional configuration diagram of a subject vehicle M.

FIG. 2 is functional configuration diagram focusing on a vehicle control system 100 according to a first embodiment. In the subject vehicle M, a detection device DD including finders 20, radars 30, a camera 40, an illuminance sensor 45, and the like, a navigation device 50, a communication device 55, a vehicle sensor 60, a human machine interface (HMI) 70, a vehicle control system 100, a running driving force output device 200, a steering device 210, and a brake device 220 are mounted. Such devices and units are interconnected through a multiple-communication line such as a controller area network (CAN) communication line, a serial communication line, a radio communication network, or the like. A vehicle control system described in the claims may represent not only the "vehicle control system 100" but may include components (the detection unit DD, the HMI 70, and the like) other than the vehicle control system 100.

The navigation device 50 includes a global navigation satellite system (GNSS) receiver, map information (navigation map), a touch panel-type display device functioning as a user interface, a speaker, a microphone, and the like. The navigation device 50 identifies a location of the subject vehicle M using the GNSS receiver and derives a route from the location to a destination designated by a user. The route derived by the navigation device 50 is provided to the target lane determining unit 110 of the vehicle control system 100. The location of the subject vehicle M may be identified or complemented by an inertial navigation system (INS) using an output of the vehicle sensor 60. In addition, when the vehicle control system 100 implements a manual driving mode, the navigation device 50 performs guidance using speech or a navigation display for a route to the destination. Components used for identifying the location of the subject vehicle M may be disposed to be independent from the navigation device 50. In addition, the navigation device 50, for example, may be realized by a function of a terminal device such as a smartphone, a tablet terminal, or the like held by a user. In such a case, information is transmitted and received using wireless or wired communication between the terminal device and the vehicle control system 100.

The communication device 55, for example, performs radio communication using a cellular network, a Wi-Fi network, Bluetooth (registered trademark), a dedicated short range communication (DSRC), or the like.

The vehicle sensor 60 includes a vehicle speed sensor detecting a vehicle speed, an acceleration sensor detecting an acceleration, a yaw rate sensor detecting an angular velocity around a vertical axis, an azimuth sensor detecting the azimuth of the subject vehicle M, and the like.

Figure 3:
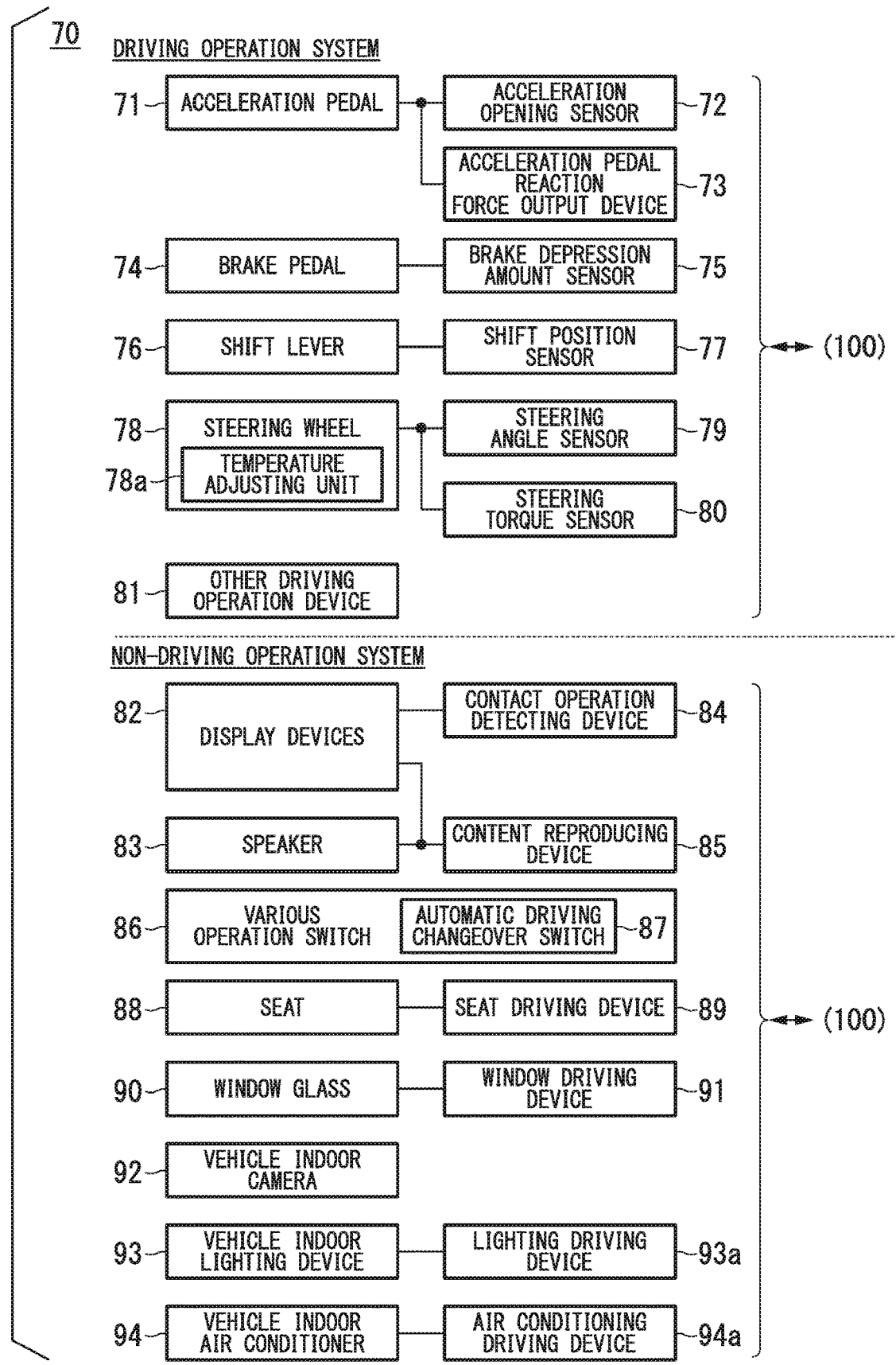
FIG. 3 is a configuration diagram of an HMI 70.

FIG. 3 is a configuration diagram of the HMI 70. The HMI 70, for example, includes a configuration of a driving operation system and a configuration of a non-driving operation system. A boundary therebetween is not clear, and a configuration of a driving operation system may have a function of a non-driving operation system (or the reverse).

For the configuration of the driving operation system, the HMI 70, for example, includes an acceleration pedal 71, an acceleration opening sensor 72, an acceleration pedal reaction force output device 73, a brake pedal 74, a brake depression amount sensor (or a master pressure sensor or the like) 75, a shift lever 76, a shift position sensor 77, a steering wheel 78, a steering angle sensor 79, a steering torque sensor 80, and other driving operation devices 81.

The acceleration pedal 71 is an operator that is used for receiving an acceleration direction (or a deceleration direction using a returning operation) from a vehicle occupant. The acceleration opening sensor 72 detects a depression amount of the acceleration pedal 71 and outputs an acceleration opening signal representing the depression amount to the vehicle control system 100. In addition, instead of outputting the acceleration opening signal to the vehicle control system 100, the acceleration opening signal may be directly output to the running driving force output device 200, the steering device 210, or the brake device 220. This similarly applies also to the configuration of the other driving operation system described below. The acceleration pedal reaction force output device 73, for example, outputs a force in a direction opposite to an operation direction (operation reaction force) to the acceleration pedal 71 in response to a direction from the vehicle control system 100.

The brake pedal 74 is an operator that is used for receiving a deceleration direction from a vehicle occupant. The brake depression amount sensor 75 detects a depression amount (or a depressing force) of the brake pedal 74 and outputs a brake signal representing a result of the detection to the vehicle control system 100.

The shift lever 76 is an operator that is used for receiving a direction for changing a shift level from a vehicle occupant. The shift position sensor 77 detects a shift level directed from a vehicle occupant and outputs a shift position signal representing a result of the detection to the vehicle control system 100.

The steering wheel 78 is an operator that is used for receiving a turning direction from a vehicle occupant. The steering angle sensor 79 detects an operation angle of the steering wheel 78 and outputs a steering angle signal representing a result of the detection to the vehicle control system 100. The steering torque sensor 80 detects a torque applied to the steering wheel 78 and outputs a steering torque signal representing a result of the detection to the vehicle control system 100.

A temperature adjusting unit 78a is attached to the steering wheel 78. The temperature adjusting unit 78a is a heat generating unit such as a heater built into the steering wheel 78, a heat exchange unit having a heat generating function or a cooling function, or a partial air conditioner supplying heated air or cool air toward the steering wheel 78. The temperature adjusting unit 78a adjusts the temperature of a surface of the steering wheel 78 that is gripped by a vehicle occupant in accordance with the control of the HMI control unit 170.

The other driving operation devices 81, for example, are buttons, a joystick, a dial switch, a graphical user interface (GUI) switch, and the like. The other driving operation devices 81 receive an acceleration direction, a deceleration direction, a turning direction, and the like and output the received directions to the vehicle control system 100.

For the configuration of the non-driving operation system, the HMI 70, for example, includes a display device 82, a speaker 83, a contact operation detecting device 84, a content reproducing device 85, various operation switches 86, a seat 88, a seat driving device 89, a window glass 90, a window driving device 91, a vehicle indoor camera 92, a vehicle indoor lighting device 93, a lighting driving device 93a, a vehicle indoor air conditioner 94, and an air conditioning driving device 94a.

The display device 82, for example, is a liquid crystal display (LCD), an organic electroluminescence (EL) display device, or the like attached to an arbitrary position facing an assistant driver's seat or a rear seat. In addition, the display device 82 may be a head up display (HUD) that projects an image onto a front windshield or any other window. The speaker 83 outputs speech. In a case in which the display device 82 is a touch panel, the contact operation detecting device 84 detects a contact position (touch position) on a display screen of the display device 82 and outputs the detected contact position to the vehicle control system 100. On the other hand, in a case in which the display device 82 is not a touch panel, the contact operation detecting device 84 may be omitted.

The content reproducing device 85, for example, includes a digital versatile disc (DVD) reproduction device, a compact disc (CD) reproduction device, a television set, a device for generating various guidance images, and the like. A part or whole of each of the display device 82, the speaker 83, the contact operation detecting device 84, and the content reproducing device 85 may be configured to be shared by the navigation device 50.

The various operation switches 86 are disposed at arbitrary positions inside a vehicle cabin. The various operation switches 86 includes an automatic driving changeover switch 87 that directs starting (or starting in the future) and stopping of automatic driving. The automatic driving changeover switch 87 may be any one of a graphical user interface (GUI) switch and a mechanical switch. In addition, the various operation switches 86 may include switches used for driving the seat driving device 89, the window driving device 91, the lighting driving device 93a, and the air conditioning driving device 94a.

The seat 88 is a seat on which a vehicle occupant sits. The seat driving device 89 freely drives a reclining angle, a forward/backward position, a yaw rate, and the like of the seat 88. The window glass 90, for example, is disposed in each door. The window driving device 91 drives opening and closing of the window glass 90.

The vehicle indoor camera 92 is a digital camera that uses solid-state imaging devices such as CCDs or CMOSs. The vehicle indoor camera 92 is attached to a position such as a rearview mirror, a steering boss unit, or an instrument panel at which at least a head part of a vehicle occupant performing a driving operation can be imaged. The vehicle indoor camera 92, for example, repeatedly images a vehicle occupant periodically.

The vehicle indoor lighting device 93 includes a light source such as a light emitting diode. The vehicle indoor lighting device 93 is installed at an arbitrary position inside the vehicle cabin and has an operation controlled on the basis of a vehicle occupant's operation. A control signal based on a vehicle occupant's operation on the various operation switches 86 is supplied to the lighting driving device 93a through the HMI control unit 170 or directly from the various operation switches 86. The lighting driving device 93a operates or stops the vehicle indoor lighting device 93 or adjusts the amount of light emission of the vehicle indoor lighting device 93 in accordance with a control signal. The lighting driving device 93a adjusts the amount of light emission of the vehicle indoor lighting device 93 by adjusting the luminance of the vehicle indoor lighting device 93 or adjusting the opening area of a light emission face of the vehicle indoor lighting device 93 by adjusting a voltage or a current supplied to the vehicle indoor lighting device 93. The lighting driving device 93a may control the wavelength of light emitted by the vehicle indoor lighting device 93. For example, the lighting driving device 93a may control the wavelength of light emitted by the vehicle indoor lighting device 93 by performing switching between wavelength selection filters (color filters).

Before description of the vehicle control system 100, the running driving force output device 200, the steering device 210, and the brake device 220 will be described.

The running driving force output device 200 outputs a running driving force (torque) used for running the vehicle to driving wheels. For example, the running driving force output device 200 includes an engine, a transmission, and an engine control unit (ECU) controlling the engine in a case in which the subject vehicle M is an automobile having an internal combustion engine as its power source, includes a running motor and a motor ECU controlling the running motor in a case in which the subject vehicle M is an electric vehicle having a motor as its power source, and includes an engine, a transmission, an engine ECU, a running motor, and a motor ECU in a case in which the subject vehicle M is a hybrid vehicle. In a case in which the running driving force output device 200 includes only an engine, the engine ECU adjusts a throttle opening degree, a shift level, and the like of the engine in accordance with information input from a running control unit 160 to be described later. On the other hand, in a case in which the running driving force output device 200 includes only a running motor, the motor ECU adjusts a duty ratio of a PWM signal given to the running motor in accordance with information input from the running control unit 160. In a case in which the running driving force output device 200 includes an engine and a running motor, an engine ECU and a motor ECU control a running driving force in cooperation with each other in accordance with information input from the running control unit 160.

The steering device 210, for example, includes a steering ECU and an electric motor. The electric motor, for example, changes the direction of a steering wheel by applying a force to a rack and pinion mechanism. The steering ECU changes the direction of the steering wheels by driving the electric motor in accordance with information input from the vehicle control system 100 or information of a steering angle or a steering torque that is input.

The brake device 220, for example, is an electric servo brake device including a brake caliper, a cylinder delivering hydraulic pressure to the brake caliper, an electric motor generating hydraulic pressure in the cylinder, and a brake control unit. The brake control unit of the electric servo brake device performs control of the electric motor in accordance with information input from the running control unit 160 such that a brake torque according to a braking operation is output to each vehicle wheel. The electric servo brake device may include a mechanism delivering hydraulic pressure generated by an operation of the brake pedal to the cylinder through a master cylinder as a backup. In addition, the brake device 220 is not limited to the electric servo brake device described above and may be an electronic control-type hydraulic brake device. The electronic control-type hydraulic brake device delivers hydraulic pressure of the master cylinder to the cylinder by controlling an actuator in accordance with information input from the running control unit 160. In addition, the brake device 220 may include a regenerative brake using the running motor which can be included in the running driving force output device 200.

[Vehicle Control System]

Hereinafter, the vehicle control system 100 will be described. The vehicle control system 100, for example, is realized by one or more processors or hardware having functions equivalent thereto. The vehicle control system 100 may be configured by combining an electronic control unit (ECU), a micro-processing unit (MPU), or the like in which a processor such as a central processing unit (CPU), a storage device, and a communication interface are interconnected through an internal bus.

Referring to FIG. 2, the vehicle control system 100, for example, includes a target lane determining unit 110, an automatic driving control unit 120, a running control unit 160, and a storage unit 180. The automatic driving control unit 120, for example, includes, an automatic driving mode control unit 130, a subject vehicle position recognizing unit 140, an external system recognizing unit 142, an action plan generating unit 144, a locus generating unit 146, and a switching control unit 150. Some or all of the target lane determining unit 110, each unit of the automatic driving control unit 120, and the running control unit 160 are realized by a processor executing a program (software). In addition, some or all of these may be realized by hardware such as a large scale integration (LSI) or an application specific integrated circuit (ASIC) or may be realized by combining software and hardware.

In the storage unit 180, for example, information such as high-precision map information 182, target lane information 184, action plan information 186, and the like is stored. The storage unit 180 is realized by a read only memory (ROM), a random access memory (RAM), a hard disk drive (HDD), a flash memory, or the like. A program executed by the processor may be stored in the storage unit 180 in advance or may be downloaded from an external device through in-vehicle internet facilities or the like. In addition, a program may be installed in the storage unit 180 by mounting a portable-type storage medium storing the program in a drive device not illustrated in the drawing. Furthermore, the vehicle control system 100 may be distributed in a plurality of computer devices.

The target lane determining unit 110, for example, is realized by an MPU. The target lane determining unit 110 divides a route provided from the navigation device 50 into a plurality of blocks (for example, divides the route at every 100 [m] in the vehicle advancement direction) and determines a target lane for each block by referring to the high-precision map information 182. The target lane determining unit 110, for example, determines a lane, in which the subject vehicle runs, represented using a position from the left side. For example, in a case in which a branching point, a merging point, or the like is present in the route, the target lane determining unit 110 determines a target lane such that the subject vehicle M can run in a running route that is rational for advancing to a branching destination. The target lane determined by the target lane determining unit 110 is stored in the storage unit 180 as target lane information 184.

The high-precision map information 182 is a map information having higher precision than that of the navigation map included in the navigation device 50. The high-precision map information 182, for example, includes information of the center of a lane or information of boundaries of a lane and the like. In addition, in the high-precision map information 182, road information, traffic regulations information, address information (an address and a zip code), facilities information, telephone number information, and the like may be included. In the road information, information representing a type of road such as an expressway, a toll road, a national road, or a prefectural road and information such as the number of lanes of a road, a width of each lane, a gradient of a road, the position of a road (three-dimensional coordinates including longitude, latitude, and a height), a curvature of the curve of a lane, locations of merging and branching points of lanes, signs installed on a road, and the like are included. In the traffic regulations information, information of closure of a lane due to roadwork, traffic accidents, congestion, or the like is included.

The automatic driving mode control unit 130 determines a mode of automatic driving performed by the automatic driving control unit 120. Modes of automatic driving according to this embodiment include the following modes. The followings are merely examples, and the number of the modes of automatic driving may be arbitrarily determined.

[Mode A]

A mode A is a mode of which the degree of automatic driving is the highest. In a case in which the mode A is executed, the entire vehicle control such as complicated merging control is automatically performed, and accordingly, a vehicle occupant does not need to monitor the vicinity or the state of the subject vehicle M.

[Mode B]

A mode is a mode of which a degree of automatic driving is the second highest after the mode A. In a case in which the mode B is executed, generally, the entire vehicle control is automatically performed, but a driving operation of the subject vehicle M may be given over to a vehicle occupant in accordance with situations. For this reason, the vehicle occupant needs to monitor the vicinity and the state of the subject vehicle M.

[Mode C]

A mode C is a mode of which a degree of automatic driving is the third highest after the mode B. In a case in which the mode C is executed, a vehicle occupant needs to perform a checking operation according to situations on the HMI 70. In the mode C, for example, in a case in which a timing for a lane change is notified to a vehicle occupant, and the vehicle occupant performs an operation of directing a lane change for the HMI 70, automatic lane change is performed. For this reason, the vehicle occupant needs to monitor the vicinity and the state of the subject vehicle M.

The automatic driving mode control unit 130 determines a mode of automatic driving on the basis of a vehicle occupant's operation on the HMI 70, an event determined by the action plan generating unit 144, and a running mode determined by the locus generating unit 146. The mode of automatic driving is notified to the HMI control unit 170. In addition, in the mode of automatic driving, a limit according to the performance and the like of the detection device DD of the subject vehicle M may be set. For example, in a case in which the performance of the detection device DD is low, the mode A may not be executed. In both modes, switching to a manual driving mode (overriding) can be made by performing an operation on the configuration of the driving operation system of the HMI 70.

The subject vehicle position recognizing unit 140 of the automatic driving control unit 120 recognizes a lane (running lane) in which the subject vehicle M is running and a relative position of the subject vehicle M with respect to the running lane on the basis of the high-precision map information 182 stored in the storage unit 180 and information input from the finder 20, the radar 30, the camera 40, the navigation device 50, or the vehicle sensor 60.

For example, the subject vehicle position recognizing unit 140 compares a pattern of road partition lines recognized from the high-precision map information 182 (for example, an array of solid lines and broken lines) with a pattern of road partition lines in the vicinity of the subject vehicle M that has been recognized from an image captured by the camera 40, thereby recognizing a running lane. In the recognition, the position of the subject vehicle M acquired from the navigation device 50 or a result of the process executed by an INS may be additionally taken into account.

Figure 4:
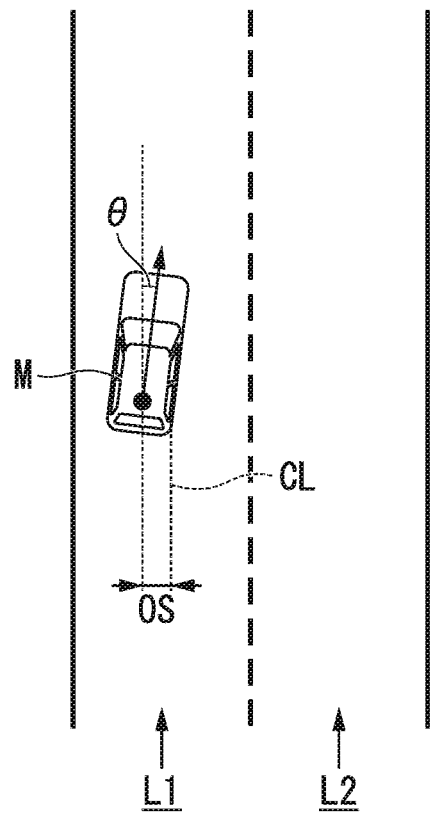
FIG. 4 is a diagram illustrating a view in which a relative position of a subject vehicle M with respect to a running lane L1 is recognized by a subject vehicle position recognizing unit 140.

FIG. 4 is a diagram illustrating a view in which a relative position of a subject vehicle M with respect to a running lane L1 is recognized by the subject vehicle position recognizing unit 140. For example, the subject vehicle position recognizing unit 140 recognizes an offset OS of a reference point (for example, the center of gravity) of the subject vehicle M from the center CL of the running lane and an angle θ of an advancement direction of the subject vehicle M formed with respect to a line along the center CL of the running lane as a relative position of the subject vehicle M with respect to the running lane L1. In addition, instead of this, the subject vehicle position recognizing unit 140 may recognize a position of a reference point on the subject vehicle M with respect to a side end part of the own lane L1 and the like as a relative position of the subject vehicle M with respect to the running lane. The relative position of the subject vehicle M recognized by a subject vehicle position recognizing unit 140 is provided to the target lane determining unit 110.

The external system recognizing unit 142 recognizes states of each surrounding vehicle such as a position, a speed, an acceleration, and the like thereof on the basis of information input from the finder 20, the radar 30, the camera 40, and the like. For example, a surrounding vehicle is a vehicle running in the vicinity of the subject vehicle M and is a vehicle running in the same direction as that of the subject vehicle M. The position of a surrounding vehicle may be represented as a representative point on another vehicle such as the center of gravity, a corner, or the like and may be represented by an area represented by the contour of another vehicle. The "state" of a surrounding vehicle is acquired on the basis of information of various devices described above and may include an acceleration of a surrounding vehicle and whether or not a lane is being changed (or whether or not a lane is to be changed). In addition, the external system recognizing unit 142 may recognize positions of a guard rail and a telegraph pole, a parked vehicle, a pedestrian, and other objects in addition to the surrounding vehicles.

The action plan generating unit 144 sets a start point of automatic driving and/or a destination of the automatic driving. The start point of automatic driving may be the current position of the subject vehicle M or a point at which an operation directing automatic driving is performed. The action plan generating unit 144 generates an action plan for a section between the start point and a destination of the automatic driving. The section is not limited thereto, and the action plan generating unit 144 may generate an action plan for an arbitrary section.

The action plan, for example, is configured of a plurality of events that are sequentially executed. The events, for example, include a deceleration event of decelerating the subject vehicle M, an acceleration event of accelerating the subject vehicle M, a lane keeping event of causing the subject vehicle M to run without deviating from a running lane, a lane changing event of changing a running lane, an overtaking event of causing the subject vehicle M to overtake a vehicle running ahead, a branching event of changing lane to a desired lane at a branching point or causing the subject vehicle M to run without deviating from a current running lane, a merging event of accelerating/decelerating the subject vehicle M and changing a running lane in a merging lane for merging into a main lane, and a handover event of transitioning to a manual driving mode to an automatic driving mode at a start point of automatic driving or transitioning from the automatic driving mode to the manual driving mode at a planned end point of automatic driving, and the like. The action plan generating unit 144 sets a lane changing event, a branching event, or a merging event at a place at which a target lane determined by the target lane determining unit 110 is changed. Information representing the action plan generated by the action plan generating unit 144 is stored in the storage unit 180 as action plan information 186.

Figure 5:
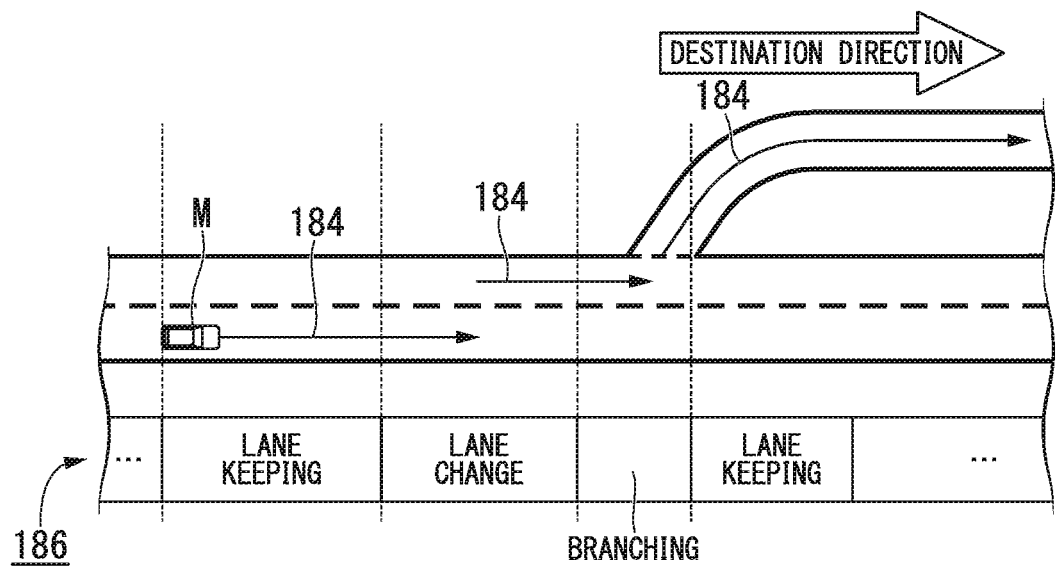
FIG. 5 is a diagram illustrating one example of an action plan generated for a certain section.

FIG. 5 is a diagram illustrating one example of an action plan generated for a certain section. As illustrated in the drawing, the action plan generating unit 144 generates an action plan that is necessary for the subject vehicle M to run on a target lane indicated by the target lane information 184. In addition, the action plan generating unit 144 may dynamically change the action plan in accordance with a change in the status of the subject vehicle M regardless of the target lane information 184. For example, in a case in which a speed of a surrounding vehicle recognized during the running of the vehicle by the external system recognizing unit 142 exceeds a threshold, or a moving direction of a surrounding vehicle running on a lane adjacent to the own lane (running lane) is directed toward the direction of the own lane, the action plan generating unit 144 may change the event set in a driving section on which the subject vehicle M plans to run. For example, in a case in which an event is set such that a lane changing event is executed after a lane keeping event, when it is determined that a vehicle is running at a speed that is a threshold or more from the behind in a lane that is a lane change destination during the lane keeping event in accordance with a result of the recognition of the external system recognizing unit 142, the action plan generating unit 144 may change the next event after a lane keeping event from a lane changing event to a deceleration event, a lane keeping event, or the like. As a result, also in a case in which a change in the state of the external system occurs, the vehicle control system 100 can cause the subject vehicle M to safely run automatically.

Figure 6:
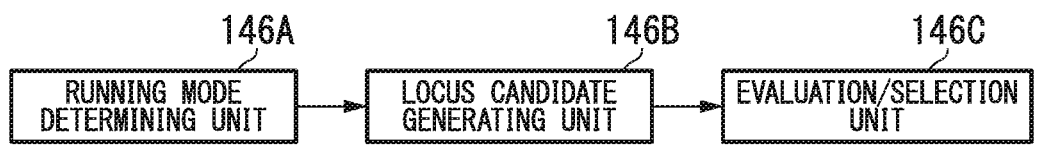
FIG. 6 is a diagram illustrating one example of the configuration of a locus generating unit 146.

FIG. 6 is one example of the configuration of the locus generating unit 146. The locus generating unit 146, for example, includes a running mode determining unit 146A, a locus candidate generating unit 146B, and an evaluation/selection unit 146C.

When the lane keeping event is executed, the running mode determining unit 146A determines one running mode among constant-speed running, following running, low-speed following running, decelerating running, curve running, obstacle avoidance running, and the like. For example, in a case in which another vehicle is not present in front of the subject vehicle M, the running mode determining unit 146A determines constant-speed running as the running mode. In addition, in a case in which following running for a vehicle running ahead is to be executed, the running mode determining unit 146A determines following running as the running mode. In addition, in the case of a congestion situation or the like, the running mode determining unit 146A determines low-speed following running as the running mode. Furthermore, in a case in which deceleration of a vehicle running ahead is recognized by the external system recognizing unit 142 or in a case in which an event of stopping, parking, or the like is to be executed, the running mode determining unit 146A determines decelerating running as the running mode. In addition, in a case in which the subject vehicle M is recognized to have reached a curved road by the external system recognizing unit 142, the running mode determining unit 146A determines the curve running as the running mode. Furthermore, in a case in which an obstacle is recognized in front of the subject vehicle M by the external system recognizing unit 142, the running mode determining unit 146A determines the obstacle avoidance running as the running mode.

Figure 7:
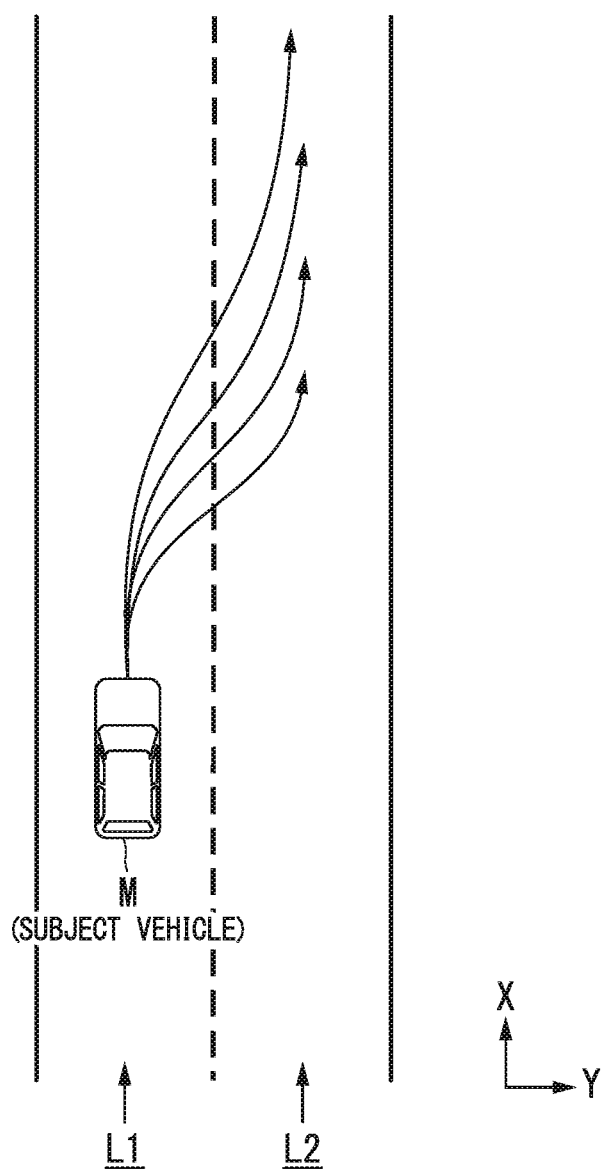
FIG. 7 is a diagram illustrating one example of candidates for a locus generated by a locus candidate generating unit 146B.

The locus candidate generating unit 146B generates candidates for a locus on the basis of the running mode determined by the running mode determining unit 146A. FIG. 7 is a diagram illustrating one example of candidates for a locus that are generated by the locus candidate generating unit 146B. FIG. 7 illustrates candidates for loci generated in a case in which a subject vehicle M changes lanes from a lane L1 to a lane L2.

Figure 8:
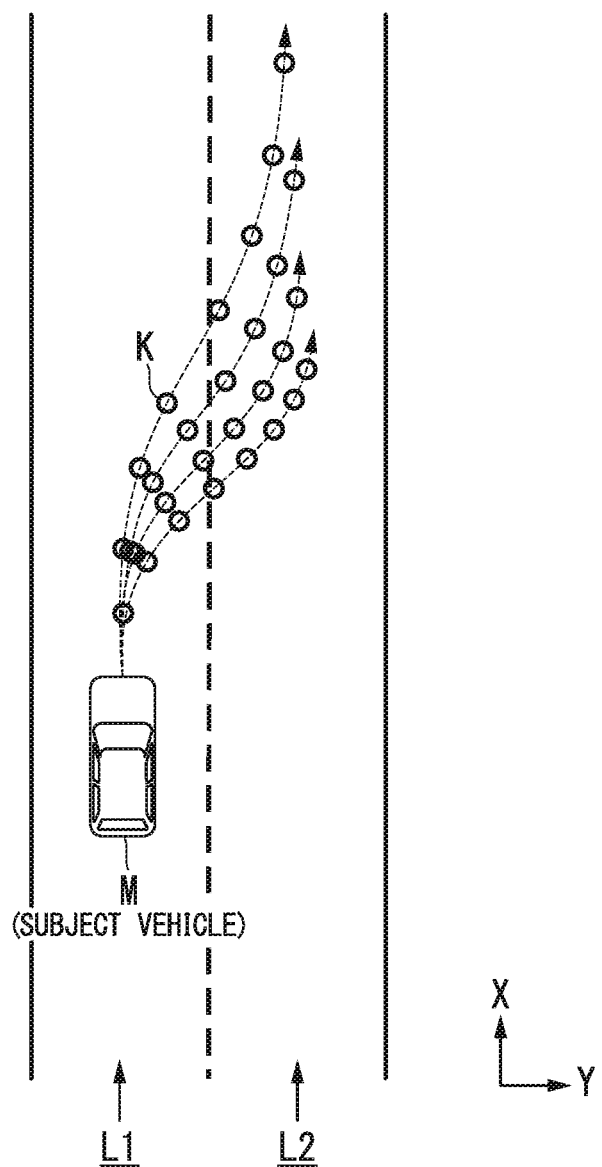
FIG. 8 is a diagram in which candidates for a locus generated by a locus candidate generating unit 146B are represented using locus points K.

The locus candidate generating unit 146B, for example, determines loci as illustrated in FIG. 7 as aggregations of target positions (locus points K) that the reference position (for example, the center of gravity or the center of a rear wheel shaft) of the subject vehicle M will reach at predetermined times in the future. FIG. 8 is a diagram in which candidates for a locus generated by the locus candidate generating unit 146B are represented using locus points K. As a gap between the locus points K becomes wider, the speed of the subject vehicle M increases. On the other hand, as a gap between the locus points K becomes narrower, the speed of the subject vehicle M decreases. Thus, in a case in which acceleration is desired, the locus candidate generating unit 146B gradually increases the gap between the locus points K. On the other hand, in a case in which deceleration is desired, the locus candidate generating unit 146B gradually decreases the gap between the locus points.

In this way, since the locus points K include a speed component, the locus candidate generating unit 146B needs to give a target speed to each of the locus points K. The target speed is determined in accordance with the running mode determined by the running mode determining unit 146A.

Figure 9:
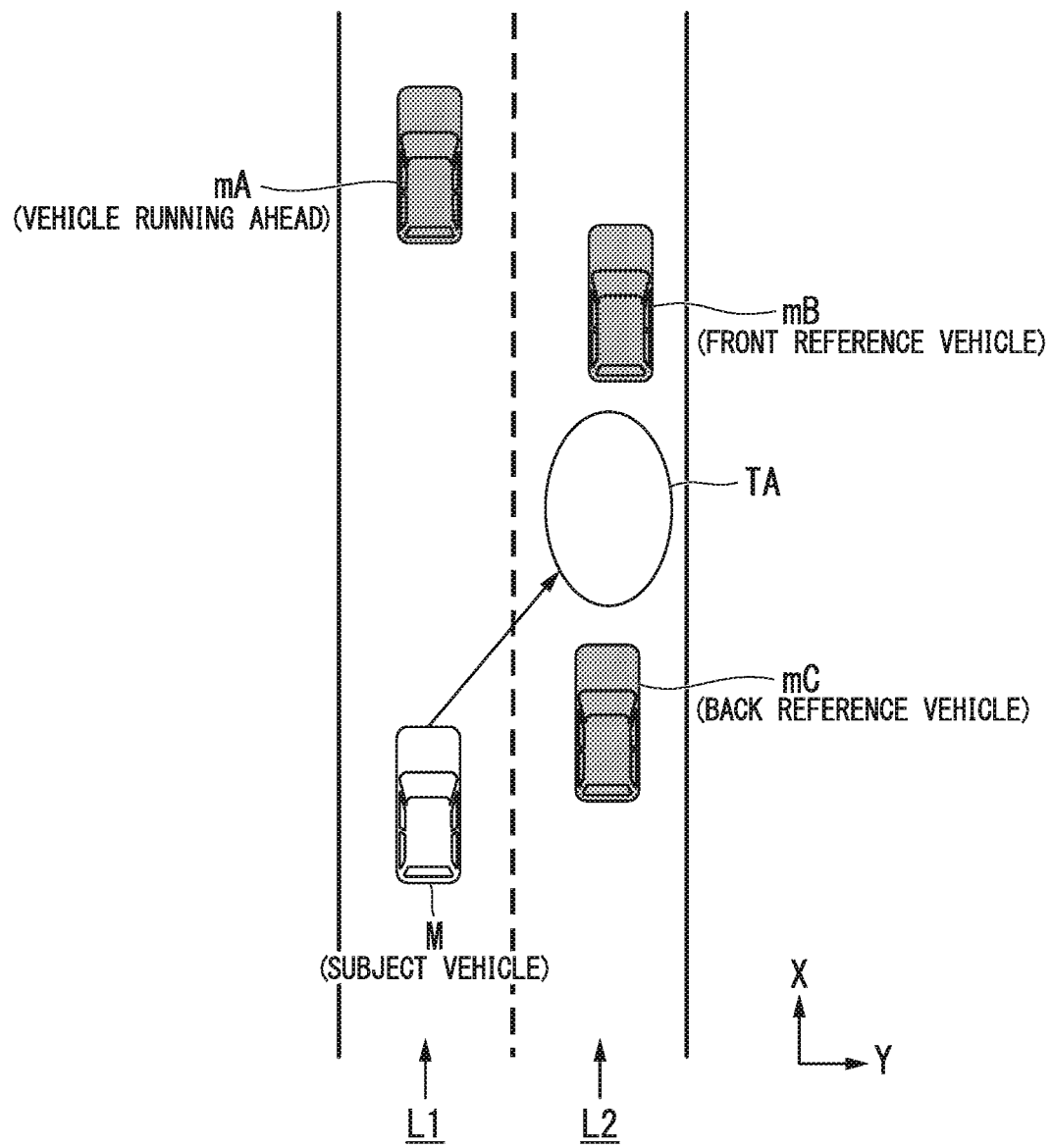
FIG. 9 is a diagram illustrating a lane change target position TA.

Here, a technique for determining a target speed in a case in which a lane change (including branching) is performed will be described. The locus candidate generating unit 146B, first, sets a lane change target position (or a merging target position). The lane change target position is set as a relative position with respect to a surrounding vehicle and is for determining "surrounding vehicles between which a lane change is performed." The locus candidate generating unit 146B determines a target speed of a case in which a lane change is performed focusing on three surrounding vehicles using the lane change target position as a reference. FIG. 9 is a diagram illustrating a lane change target position TA. In the drawing, an own lane L1 is illustrated, and an adjacent lane L2 is illustrated. Here, in the same lane as that of the subject vehicle M, a surrounding vehicle running immediately before the subject vehicle M will be defined as a vehicle mA running ahead, a surrounding vehicle running immediately before the lane change target position TA will be defined as a front reference vehicle mB, and a surrounding vehicle running immediately after the lane change target position TA will be defined as a rear reference vehicle mC. When the subject vehicle M needs to perform acceleration/deceleration for movement to the lateral side of the lane change target position TA, at this time, overtaking the vehicle mA running ahead needs to be avoided. For this reason, the locus candidate generating unit 146B predicts future states of the three surrounding vehicles and sets a target speed such that there is no interference with each of the surrounding vehicles.

Figure 10:
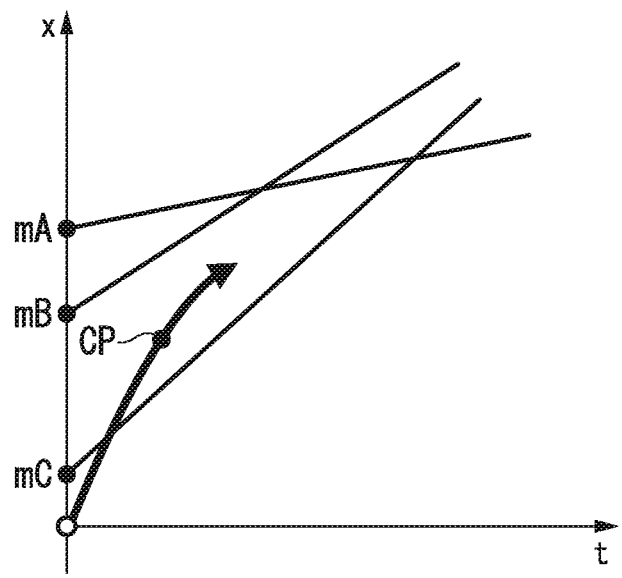
FIG. 10 is a diagram illustrating a speed generation model of a case in which the speeds of three surrounding vehicles are assumed to be constant.

FIG. 10 is a diagram illustrating a speed generation model of a case in which the speeds of three surrounding vehicles are assumed to be constant. In the drawing, straight lines extending from mA, mB, and mC respectively represent displacements in the advancement direction in a case in which each of the surrounding vehicles is assumed to run at a constant speed. At a point CP at which the lane change is completed, the subject vehicle M needs to be present between the front reference vehicle mB and the back reference vehicle mC and needs to be present behind the vehicle mA running ahead before that. Under such restrictions, the locus candidate generating unit 146B derives a plurality of time series patterns of the target speed until the lane change is completed. Then, by applying the time series patterns of the target speed to a model of a spline curve or the like, a plurality of candidates for loci as illustrated in FIG. 8 are derived. In addition, the movement patterns of the three surrounding vehicles are not limited to the constant speeds as illustrated in FIG. 10 and may be predicted on the premise of constant accelerations or constant jerks (derivatives of accelerations).

The evaluation/selection unit 146C performs evaluations for the generated candidates for the locus generated by the locus candidate generating unit 146B, for example, from two viewpoints of planning and safety and selects a locus to be output to the running control unit 160. From the viewpoint of the planning, for example, a locus is evaluated to be high in a case in which the followability for a plane that has already been generated (for example, an action plan) is high, and the total length of the locus is short. For example, in a case in which it is desirable to perform a lane change to the right side, a locus in which a lane change to the left side is performed once, and then, the subject vehicle is returned has a low evaluation. From the viewpoint of the safety, for example, in a case in which, at each locus point, a distance between the subject vehicle M and an object (a surrounding vehicle or the like) is long, and the acceleration/deceleration and the amounts of changes in the steering angle are small, the locus is evaluated as being high.

The switching control unit 150 performs switching between the automatic driving mode and the manual driving mode on the basis of a signal input from the automatic driving changeover switch 87. In addition, the switching control unit 150 switches the driving mode from the automatic driving mode to the manual driving mode on the basis of an operation directing acceleration, deceleration, or steering for the configuration of the driving operation system of the HMI 70. For example, in a case in which the amount of operation represented by a signal input from the configuration of the driving operation system of the HMI 70 exceeds a threshold, the switching control unit 150 switches the driving mode from the automatic driving mode to the manual driving mode (overriding). In addition, in a case in which an operation for the configuration of the driving operation system of the HMI 70 has not been detected for a predetermined time after the switching to the manual driving mode according to the overriding, the switching control unit 150 may return the driving mode to the automatic driving mode.

The running control unit 160 performs control of the running driving force output device 200, the steering device 210, and the brake device 220 such that the subject vehicle M passes through the locus generated by the locus generating unit 146 at a planned time.

Hereinafter, in a case in which a transition to the second driving mode of which the degree of automatic driving is lower than that of the first driving mode is made, control of the HMI 70 as an environment device of the subject vehicle M for causing the environment of the subject vehicle M to be in a state appropriate for the second driving mode will be described. Here, although the first driving mode is a mode in which a vehicle occupant does not need to monitor the vicinity of the subject vehicle M, and the second driving mode is a mode in which a vehicle occupant needs to monitor the vicinity of the subject vehicle M, the first and second driving modes are not limited thereto. For example, the first driving mode may represent an automatic driving mode (one of the mode A to the mode C), and the second driving mode may represent the manual driving mode. In a case in which the first driving mode represents the mode A, the second driving mode may represent the mode B or the mode C. For example, both the first driving mode and the second driving mode may be modes in which a vehicle occupant needs to monitor the vicinity of the subject vehicle M. For example, in a case in which the first driving mode represents the mode B, the second driving mode may represent the mode C.

Figure 11:
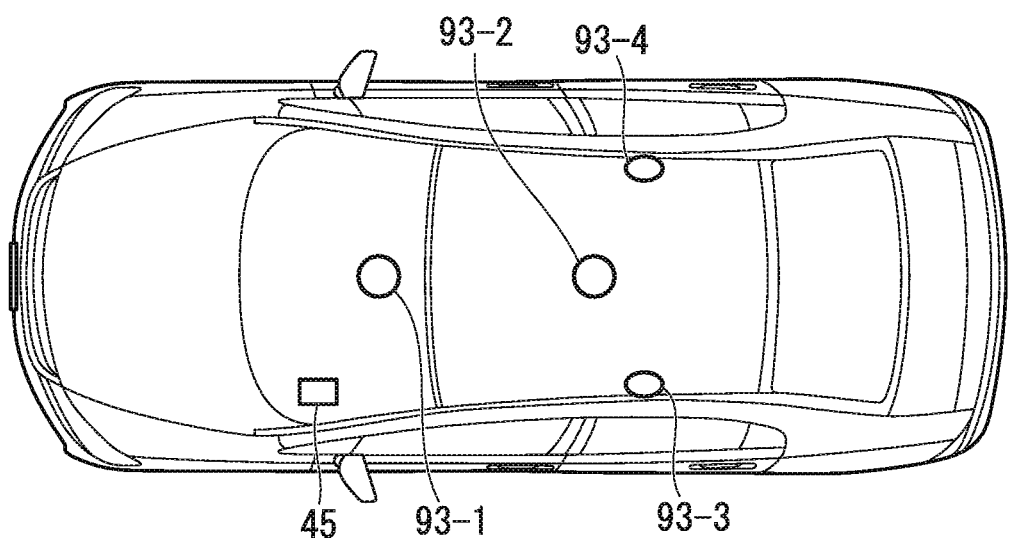
FIG. 11 is a diagram illustrating one example of lighting devices mounted in the subject vehicle M.

FIG. 11 is a diagram illustrating one example of lighting devices mounted in the subject vehicle M. In the subject vehicle M, for example, a front lighting device 93-1 disposed near a room mirror, a ceiling lighting device 93-2 disposed at the ceiling inside the vehicle cabin, a left-side lighting device 93-3 disposed above a left-side door of the subject vehicle M, a right-side lighting device 93-4 disposed above a right-side door of the subject vehicle M, and other lighting devices 93-5 (not illustrated in the drawing) are mounted. Each of the front lighting device 93-1, the ceiling lighting device 93-2, the left-side lighting device 93-3, the right-side lighting device 93-4, and the other lighting devices 93-5 may include a corresponding lighting driving device 93a (not illustrated in the drawing) or may be controlled by one lighting driving device 93a (not illustrated in the drawing).

FIG. 12 is a diagram illustrating relations between the front lighting device 93-1, the ceiling lighting device 93-2, the left-side lighting device 93-3, the right-side lighting device 93-4, and the other lighting devices 93-5 and the HMI control unit 170. A control signal is supplied from the HMI control unit 170 to each of the front lighting device 93-1, the ceiling lighting device 93-2, the left-side lighting device 93-3, the right-side lighting device 93-4, and the other lighting devices 93-5. The front lighting device 93-1, the ceiling lighting device 93-2, the left-side lighting device 93-3, the right-side lighting device 93-4, and the other lighting devices 93-5 operate in accordance with supplied control signals.

FIG. 13 is a flowchart illustrating one example of a process of controlling the vehicle indoor lighting devices 93. In the following description, in a case in which the front lighting device 93-1, the ceiling lighting device 93-2, the left-side lighting device 93-3, the right-side lighting device 93-4, and the other lighting devices 93-5 do not need to be distinguished from each other, each thereof will be referred to as a "vehicle indoor lighting device 93."

The action plan generating unit 144 determines whether or not a distance from the current position of the subject vehicle M to a planned end point P1 of the automatic driving mode is within a predetermined distance (or whether or not a time until the arrival is within a predetermined time) (Step S100). FIG. 14 is a diagram illustrating one example of relations between a start point P2 and an end point P3 of environment control and the position of the subject vehicle M according to this embodiment. In the example illustrated in FIG. 14, although a side in front of an exit, which has been installed in advance, branching from an expressway is described as the planned end point P1 of the automatic driving mode, the planned end point P1 of the automatic driving mode may be an end point on a lane for automatic driving vehicles set in advance. For example, in a case in which the subject vehicle arrives at a point Pc away from the planned end point P1 of the automatic driving mode by a distance longer than D1+D2, the action plan generating unit 144 determines the a distance from the current position of the subject vehicle M to the planned end point P1 of the automatic driving mode is within a predetermined distance.

In a case in which the distance from the current position of the subject vehicle M to the planned end point P1 of the automatic driving mode is within the predetermined distance, the action plan generating unit 144 sets a position away from the end point P1 of the automatic driving mode to the subject vehicle M side by a distance D1 as a transition completion point P3 (Step S102). The action plan generating unit 144 sets a position on the subject vehicle side away from the end point P1 of the automatic driving mode to the subject vehicle M side by 10 m as a transition completion point P3. In addition, the action plan generating unit 144 sets a position away from the transition completion point P3 to the subject vehicle M side by a distance D2 as a start point P2 of environment control. At this time, the action plan generating unit 144 sets the start point P2 of environment control on the basis of a predetermined transition period in which the environment control is executed and the vehicle speed of the subject vehicle M (Step S102).

Position information of the planned end point P1 and the transition end point P3 of the automatic driving mode and the start point P2 of the environment control set by the action plan generating unit 144 is supplied to the HMI control unit 170. The HMI control unit 170 determines whether or not the subject vehicle M has reached the start point P2 of the environment control on the basis of the position of the subject vehicle M supplied from the subject vehicle position recognizing unit 140 (Step S104).

In a case in which the subject vehicle M has reached the start point P2 of the environment control, the HMI control unit 170 determines whether or not the illuminance outside of the vehicle cabin is equal to or less than a threshold (Step S106). In a case in which a signal value output by the illuminance sensor 45 is determined as being equal to or less than a signal value corresponding to the threshold, the HMI control unit 170 determines that the illuminance outside of the vehicle cabin is equal to or less than the threshold. As the threshold of the illuminance, for example, a value for which it is estimated as being difficult for a vehicle occupant to perform an operation other than driving due to darkness of the outside of the subject vehicle M is set.

In addition, in Step S106, instead of or in addition to determining of the illuminance outside of the vehicle cabin, the HMI control unit 170 may determine whether the outside of the subject vehicle M is dark on the basis of the current time. In addition, the HMI control unit 170 may determine whether the outside of the subject vehicle M is dark on the basis of a time or climate for the season or the date.

In a case in which the illuminance outside of the vehicle cabin is not equal to or less than the threshold, the HMI control unit 170 ends the process without performing environment control. In a case in which the illuminance outside of the vehicle cabin is equal to or less than the threshold, the HMI control unit 170 starts to decrease the amount of light emission of the vehicle indoor lighting devices 93 (Step S108). FIG. 15 is a diagram illustrating one example of changes in the amount of light emission of the vehicle indoor lighting device 93. At a time t1 when the subject vehicle M reaches the start point P2 of environment control, the HMI control unit 170 performs control such that the amount of light emission of the vehicle indoor lighting device 93 having a L1 that is higher than a reference value Lref becomes the reference value Lref. The HMI control unit 170 maintains the amount of light emission of the vehicle indoor lighting device 93 at the reference value Lref from the time t1 to a time t2 when the subject vehicle M reaches the transition completion point P3 and a time t3 when the subject vehicle M reaches the planned end point P1 of the automatic driving mode.

Here, the reference value Lref is an amount of light emission of the vehicle indoor lighting device 93 desired for enabling a vehicle occupant to drive the subject vehicle M in a situation in which the outside of the subject vehicle M is dark, and it is not limited thereto. The reference value Lref may be set as being a low value close to a state causing the vehicle indoor lighting device 93 to be turned off.

FIG. 16 is a diagram illustrating one example of changes in the amounts of light emission of a plurality of vehicle indoor lighting devices 93. Before the subject vehicle M reaches a start point P2 of environment control, the amount of light emission L1 of the front lighting device 93-1 is assumed to be higher than a reference value L1ref, the amount of light emission L2 of the ceiling lighting device 93-2 is assumed to be higher than a reference value L2ref, the amount of light emission L3 of the left-side lighting device 93-3 is assumed to be lower than a reference value L3ref, and the amount of light emission L4 of the right-side lighting device 93-4 is assumed to be lower than a reference value L4ref. The amount of light emission of each vehicle indoor lighting device 93, for example, is adjusted to a value desired by a vehicle occupant by the vehicle occupant operating various operation switches 86 for performing an operation other than a driving operation. The reference values may be the same value, and a value different for each lighting device may be set.

The HMI control unit 170, in Step S108, compares the amounts of light emissions (L1, L2, L3, and L4) of the front lighting device 93-1, the ceiling lighting device 93-2, the left-side lighting device 93-3, and the right-side lighting device 93-4 with the reference values (L1ref, L2ref, L3ref, and L4ref) corresponding to the vehicle indoor lighting device 93. The HMI control unit 170 controls the front lighting device 93-1 and the ceiling lighting device 93-2 of which the amounts of light emission are higher than the corresponding reference values such that the amounts of light emission (L1 and L2) are equal to or less than the reference values (L1ref and L2ref). On the other hand, since the amounts of light emission (L3 and L4) are respectively lower than the reference values (L3ref and L4ref), the HMI control unit 170 does not perform control of the amounts of light emission for the left-side lighting device 93-3 and the right-side lighting device 93-4.

The HMI control unit 170, as illustrated in FIG. 15, may instantly decrease the amount of light emission of the vehicle indoor lighting device 93 at the time t1 or, as illustrated in FIGS. 17, 18, 19, and 20, may gradually decrease the amount of light emission of the vehicle indoor lighting device 93. FIGS. 17, 18, 19, and 20 are other examples of changes in the amount of light emission of the vehicle indoor lighting device 93. In both of the cases, it is preferable that the HMI control unit 170 decreases the amount of light emission of the vehicle indoor lighting device 93 as being equal to or less than the reference value Lref at a time t2 when the subject vehicle reaches a transition completion point P3.

As illustrated in FIG. 17, the HMI control unit 170 may decrease the amount of light emission of the vehicle indoor lighting device 93 from the amount of light emission L1 higher than the reference value Lref a plurality of number of times in a stepped manner over the time t1 to the time t2.

As illustrated in FIG. 18, the HMI control unit 170 may decrease the amount of light emission of the vehicle indoor lighting device 93 from the amount of light emission L1 higher than the reference value Lref with the same slope over the time t1 to the time t2.

As illustrated in FIG. 19, the HMI control unit 170 may decrease the amount of light emission of the vehicle indoor lighting device 93 over the time t1 to the time t2 from the amount of light emission L1 higher than the reference value Lref in a curved shape having a convex part on the side of a higher amount of light emission or a curved shape having a convex part on the side of a lower amount of light emission.

As an elapsed time from a time when the amount of light emission of the vehicle indoor lighting device 93 inside the subject vehicle M is changed to be higher than a reference value increases, the HMI control unit 170 may cause at least a change in the amount of light emission immediately after the start of a decrease when the amount of light emission of the vehicle indoor lighting device 93 is decreased to the reference value Lref to be gentle, and, in a case in which an elapsed time from a time when the amount of light emission is changed as being higher than the reference value is a predetermined time, the HMI control unit 170 decreases the amount of light emission of the lighting driving device 93a with a constant slope represented by a straight line illustrated in FIG. 19. In a case in which an elapsed time from a time when the amount of light emission is changed as being higher than the reference value is longer than a predetermined time, the HMI control unit 170 decreases the amount of light emission of the lighting driving device 93a in a curved shape having a convex part on the side of a larger amount of light emission illustrated in FIG. 19. On the other hand, in a case in which an elapsed time from a time when the amount of light emission is changed as being higher than the reference value is shorter than the predetermined time, the HMI control unit 170 decreases the amount of light emission of the lighting driving device 93a in a curved shape having a convex part on the side of a smaller amount of light emission illustrated in FIG. 19. The predetermined time may be a constant value and may be adjusted to a smaller value as the amount of light emission of the vehicle indoor lighting device 93 increases. Accordingly, the amount of light emission of the vehicle indoor lighting device 93 is changed while it is considered that it is difficult for a vehicle occupant to adapt to darkness as the bright level of the inside of the vehicle cabin becomes higher.

In a case in which an elapsed time from a time when the amount of light emission is changed as being higher than the reference value is longer than a predetermined time, the HMI control unit 170, as illustrated in FIG. 20, decreases the amount of light emission of the vehicle indoor lighting device 93 over a time t1#, which is before the time t1, to the time t2. In this way, the HMI control unit 170 can cause a change in the amount of light emission of the vehicle indoor lighting device 93 to be gentler than a decrease in the amount of light emission of the vehicle indoor lighting device 93 over the time t1 to the time t2.

In addition, in a case in which the amount of light emission of the vehicle indoor lighting device 93 is decreased, the HMI control unit 170 may notify of a decrease in the amount of light emission of the vehicle inside lighting device 93. In such a case, the HMI control unit 170 may display an indication representing a transition of the driving mode of the subject vehicle M from the automatic driving mode to the manual driving mode on a display of the navigation device 50.

Next, the HMI control unit 170 determines whether or not the position of the subject vehicle M has reached the transition completion point P3 (Step S110). In a case in which the position of the subject vehicle M has reached the transition completion point P3, the HMI control unit 170 ends the control of the vehicle indoor environment (Step S112). On the other hand, in a case in which the subject vehicle M has not reached the transition completion point P3, the HMI control unit 170 determines whether or not the amount of operation for the operation device of the driving operation system is equal to or greater than a threshold (Step S114).

In a case in which the amount of operation for the HMI 70 of the driving operation system is greater than the threshold, the HMI control unit 170 changes the amount of light emission of the vehicle indoor lighting device 93 to be equal to or less than a reference value (Step S116) and ends the control of the vehicle indoor environment (Step S112). FIG. 21 is another example of changes in the amount of light emission of the vehicle indoor lighting device 93. At a timing at which the amount of operation for the HMI 70 is detected to be equal to or greater than the threshold, the HMI control unit 170 decreases the amount of light emission of the vehicle indoor lighting device 93 from L1 to the reference value Lref or less.

In the embodiment described above, although the HMI control unit 170 decreases the amount of light emission of the vehicle indoor lighting device 93 to the reference value Lref, the present invention is not limited thereto. Thus, before the start of decreasing the amount of light emission of the lighting driving device 93a, light emitted from the vehicle indoor lighting device 93 may be controlled such that it alerts a vehicle occupant. FIG. 22 is another example of changes in the amount of light emission of the vehicle indoor lighting device 93, (a) illustrates changes in the amounts of light emission of the left-side lighting device 93-3 and the right-side lighting device 93-4, and (b) illustrates changes in the amount of light emission of the ceiling lighting device 93-2.

In a case in which the position of the subject vehicle M reaches the start point P2 of environment control, the HMI control unit 170, first, as illustrated in FIG. 22(a), temporarily raises the amounts of light emission Ls of the left-side lighting device 93-3 and the right-side lighting device 93-4 from a value that is equal to or less than the reference value Lref to a value exceeding the reference value Lref. From a time t1 to a time t21, the HMI control unit 170 controls light emitted from the left-side lighting device 93-3 and the right-side lighting device 93-4 such that it alerts a vehicle occupant. In this period (from the time t1 to the time t21), the HMI control unit 170, for example, causes the left-side lighting device 93-3 and the right-side lighting device 93-4 to emit light having a large blue wavelength component, thereby alerting the vehicle occupant. The reason for this is that it is assumed that blue light has a high alerting effect. In addition, the HMI control unit 170 may prompt the vehicle occupant to be awake by adjusting a lighting pattern such as blinking of light emitted from the left-side lighting device 93-3 and the right-side lighting device 93-4.

Meanwhile, as illustrated in FIG. 22(b), in a period in which light is emitted from the left-side lighting device 93-3 and the right-side lighting device 93-4, the HMI control unit 170 maintains the amount of light emission of the ceiling lighting device 93-2 as Lr. After a timing at which light emission using the left-side lighting device 93-3 and the right-side lighting device 93-4 is stopped, the HMI control unit 170 decreases the amount of light emission of the ceiling lighting device 93-2 from Lr. The HMI control unit 170 decreases the amount of light emission of the ceiling lighting device 93-2 to be the reference value Lref or less at a time t2.

In addition, the HMI control unit 170 may cause light having a large blue wavelength component to be temporarily emitted and may cause light having a large blue wavelength component to be continuously emitted while the amount of light emission of the vehicle indoor lighting device 93 is decreased.

In the vehicle control system 100 according to the embodiment, the HMI control unit 170 is not limited to adjust the amount of light emission or the wavelength of light of the vehicle indoor lighting device 93. Thus, in a case in which a plurality of vehicle indoor lighting devices 93 are included, one thereof may be selected on the basis of the installation positions of the vehicle indoor lighting devices 93, and, in a case in which a plurality of types (a bulb, a light emitting diode, and the like) of vehicle indoor lighting device 93 are included, a type of vehicle indoor lighting device 93 may be selected, and the light distribution direction of the vehicle indoor lighting device 93 may be adjusted.

In addition, the vehicle control system 100 according to the embodiment may control head lamps of the subject vehicle M as environment devices of the subject vehicle M. From a start point P2 of environment control to a transition completion point P3, the vehicle control system 100 controls the amount of light emission and the like of the head lamps to be in a state appropriate for the second driving mode.

As described above, according to the vehicle control system 100, in a case in which a transition to the second driving mode of which the degree of automatic driving is lower than that of the first driving mode is performed, the HMI 70 is controlled such that the environment of the subject vehicle M is in a state appropriate for the second driving mode, and accordingly, a smooth transition from a driving mode performing automatic driving to a driving mode of which the degree of automatic driving is lower than that of the driving mode described above can be realized.

In addition, according to the vehicle control system 100, in a case in which execution of the first driving mode is ended at the planned end point P1 of the automatic driving mode, and a transition to the second driving mode of which the degree of automatic driving is lower than that of the first driving mode is performed, the control of the HMI 70 of the subject vehicle M is started at a timing before a timing at which the subject vehicle reaches the planned end point P1 of the automatic driving mode such that the environments of the subject vehicle M is in a state appropriate for the second driving mode at the planned end point P1 of the automatic driving mode. Accordingly, the environments of the subject vehicle M can approach the state appropriate for the second driving mode before the subject vehicle reaches the planned end point P1 of the automatic driving mode, and therefore, a smooth transition to the driving mode of which the degree of automatic driving is low can be realized.

Furthermore, according to the vehicle control system 100, in a case in which a transition to the second driving mode of which the degree of automatic driving is lower than that of the first driving mode, the amount of light emission of the vehicle indoor lighting device 93 is decreased to the reference value or less in a case in which the illuminance outside of the subject vehicle M is equal to or less than the threshold. Accordingly, the amount of light emission of the vehicle indoor lighting device 93 can be controlled to be in a state appropriate for the second driving mode, and thus, a smooth transition to the second driving mode can be realized. In other words, according to the vehicle control system 100, in the second driving mode, the surrounding environments of the subject vehicle M can be easily checked by a vehicle occupant. In addition, according to the vehicle control system 100, the labor of adjusting the amount of light emission of the vehicle indoor lighting device 93 for executing the second driving mode can be suppressed.

Furthermore, according to the vehicle control system 100, the amount of light emission of the vehicle indoor lighting device 93 is gradually decreased. Accordingly, an uncomfortable feeling given to a vehicle occupant can be further suppressed than in a case in which the amount of light emission of the vehicle indoor lighting device 93 is steeply decreased. In addition, according to the vehicle control system 100, the slope at which the amount of light emission of the vehicle indoor lighting device 93 is decreased to the reference value is caused to be gentler as an elapsed time from a time when the amount of light emission of the vehicle indoor lighting device 93 is changed to be higher than the reference value increases. Accordingly, the amount of light emission of the vehicle indoor lighting device 93 can be decreased in consideration of a period in which a vehicle occupant adapts to darkness.

Furthermore, according to the vehicle control system 100, the amount of light emission of the vehicle indoor lighting device 93 is temporarily increased before the amount of light emission of the vehicle indoor lighting device 93 is decreased to the reference value or less. Accordingly, even in a situation in which a vehicle occupant is not awake in a case in which a transition to the second driving mode is performed, the vehicle occupant can be prompted to be awake.

In addition, according to the vehicle control system 100, in a case in which execution of the first driving mode is ended, and a transition to the second driving mode is performed, light having a larger blue wavelength component is emitted to the vehicle indoor lighting device 93 than in a case other than a case in which execution of the first driving mode is ended, and a transition to the second driving mode is performed. Therefore, according to the vehicle control system 100, a vehicle occupant can be more effectively prompted to be awake.

Second Embodiment

Hereinafter, a vehicle control system 100 according to a second embodiment will be described. The vehicle control system 100 according to the second embodiment controls the vehicle indoor air conditioner 94, which is different from the vehicle control system 100 according to the first embodiment. Hereinafter, this point will be focused in description. In the vehicle control system 100 according to the second embodiment, the control of the vehicle indoor air conditioner 94 may be performed in combination with the control of the vehicle indoor lighting device 93 or may be performed independent from the control of the vehicle indoor lighting device 93.

FIG. 23 is a flowchart illustrating one example of control of the vehicle indoor air conditioner 94. The process illustrated in FIG. 23 is executed in parallel with the process illustrated in FIG. 13. An HMI control unit 170, first, determines whether or not a subject vehicle M has reached a start point P2 of environment control on the basis of the position of the subject vehicle M supplied from a subject vehicle position recognizing unit 140 (Step S200). In a case in which the subject vehicle M has reached the start point P2 of environment control, the HMI control unit 170 determines whether or not a window glass 90 is fogged up (Step S204). At this time, the HMI control unit 170 estimates whether the window glass 90 is fogged up by analyzing an image including the window glass 90 captured by a camera 40.

In a case in which it is estimated that the window glass 90 is not fogged up, the HMI control unit 170 returns the process to Step S200. On the other hand, in a case in which it is estimated that the window glass 90 is fogged up, the HMI control unit 170 starts an operation of the vehicle indoor air conditioner 94 (Step S206). At this time, the HMI control unit 170 controls the vehicle indoor air conditioner 94 such that the fogging of the window glass 90 decreases. The HMI control unit 170, for example, blows air toward a front glass.

Here, although the HMI control unit 170 estimates the fogging of the window glass 90, the estimation is not limited thereto. The HMI control unit 170 may acquire a degree of transparency of the window glass 90 on the basis of an output of a sensor and may estimate the freezing of the window glass 90.

According to such a vehicle control system 100, in a case in which execution of the first mode is ended, and a transition to the second driving mode is performed, the operation of the vehicle indoor air conditioner 94 is started in a case in which the window is fogged, and accordingly, a smooth transition from a driving mode in which automatic driving is performed to a driving mode of which the degree of automatic driving is lower than that of the driving mode described above can be realized.

Third Embodiment

Hereinafter, a vehicle control system 100 according to a third embodiment will be described. The vehicle control system 100 according to the third embodiment controls a temperature adjusting unit 78a, which is different from the vehicle control systems 100 according to the first and second embodiments. Hereinafter, this point will be focused in description. In the vehicle control system 100 according to the third embodiment, the control of the temperature adjusting unit 78a may be performed in combination with the control of the vehicle indoor lighting device 93 or the vehicle indoor air conditioner 94 or may be performed independent from the control of the vehicle indoor lighting device 93 or the vehicle indoor air conditioner 94.

FIG. 24 is a flowchart illustrating one example of control of the temperature adjusting unit 78a. The process illustrated in FIG. 24 is executed in parallel with the process illustrated in FIG. 13. An HMI control unit 170, first, determines whether or not a subject vehicle M has reached a start point P2 of environment control on the basis of the position of the subject vehicle M supplied from a subject vehicle position recognizing unit 140 (Step S300). In a case in which the subject vehicle M has reached the start point P2 of environment control, the HMI control unit 170 operates the temperature adjusting unit 78a such that the surface temperature of a steering wheel 78 is changed to a predetermined value.

FIG. 25 is one example of temperature changes in the steering wheel 78. The HMI control unit 170 gradually raises the temperature of the steering wheel 78 from T1 over a time t1 when the position of a subject vehicle M reaches the start point P2 of environment control to a time t2 when the position of the subject vehicle M reaches a transition completion point P3. The HMI control unit 170 causes the temperature of the steering wheel 78 to approach a reference value Tref at the time t2. Although the HMI control unit 170, for example, raises the temperature of the steering wheel 78 with the same slope from the temperature T1, the raise is not limited thereto. The HMI control unit 170 may instantly raise the temperature of the steering wheel 78, may raise the temperature of the steering wheel 78 in a stepped manner, or may raise the temperature of the steering wheel 78 on a curve.

According to such a vehicle control system 100, the operation of the temperature adjusting unit 78a is started in a case in which the position of the subject vehicle M reaches the start point P2 of environment control and adjusts the temperature of the steering wheel 78 to a predetermined temperature before the subject vehicle M reaches the transition completion point P3. Accordingly, a smooth transition from a driving mode performing automatic driving to a driving mode of which the degree of automatic driving is lower than that of the driving mode described above can be realized.

In addition, according to the vehicle control system 100, in a case in which the amount of operation for the HMI 70 of the driving operation system is equal to or greater than the threshold, the temperature of the steering wheel 78 may be caused to approach a predetermined temperature instantly or gradually.

As above, while the embodiments of the present invention have been described using the embodiments, the present invention is not limited to such embodiments at all, and various modifications and substitutions may be made in a range not departing from the concept of the present invention. The vehicle control system 100, for example, may control a device controlling an object that is not in a "vehicle indoor" environment such as head lamps of the subject vehicle M to be an environment that is appropriate for the second driving mode. In a case in which the state of the head lamps or the like is in a visual recognition negligence mode (a mode of which a principal objective is for notifying of the presence of the subject vehicle M to the surroundings) in any one of the modes A to C, the vehicle control system 100 may change the state of the head lamps or the like to a visual recognition priority mode in manual driving. In addition, the vehicle control system 100 may control a vehicle indoor temperature other than the temperature of the steering wheel 78 such as a seat 88 on which a vehicle occupant sits for operating the steering wheel 78 to be in an environment that is appropriate for the second driving mode.

REFERENCE SIGNS LIST

20 Finder
30 Radar
40 Camera
45 Illuminance sensor
50 Navigation device
60 Vehicle sensor
70 HMI
71 Acceleration pedal
74 Brake pedal
76 Shift lever
78 Steering wheel
86 Various operation switch
90 Window glass
93 Vehicle indoor lighting device
93a Lighting driving device
94 Vehicle indoor air conditioner
94a Air conditioning driving device
100 Vehicle control system
120 Automatic driving control unit
130 Automatic driving mode control unit
144 Action plan generating unit
150 Switching control unit
170 HMI control unit

What is claimed is:

1. A vehicle control system comprising:
an automatic driving control unit executing a first driving mode in which at least one of acceleration/deceleration and steering of a subject vehicle is automatically controlled; and
an environment control unit controlling an environment device of the subject vehicle such that an environment of the subject vehicle is in a state appropriate for a second driving mode in a case in which the automatic driving control unit ends execution of the first driving mode and transitions to a second driving mode of which a degree of automatic driving is lower than that of the first driving mode,
wherein, in a case in which the automatic driving control unit ends execution of the first driving mode at a planned end point of the first driving mode and transitions to the second driving mode of which the degree of automatic driving is lower than that of the first driving mode, the environment control unit starts control of the environment device of the subject vehicle at a timing that is before a timing at which the subject vehicle reaches the planned end point such that the environment of the subject vehicle is in a state appropriate for the second driving mode at the planned end point,
wherein the environment device includes a lighting device inside a vehicle cabin, and
wherein, in a case in which the automatic driving control unit ends execution of the first driving mode and transitions to the second driving mode, the environment control unit decreases an amount of light emission of the lighting device to below a reference value in a case in which an illuminance of an outside of the subject vehicle is equal to or less than a threshold,
wherein the environment control unit causes at least an amount of change in the amount of light emission immediately after start of a decrease when the amount of light emission of the lighting device is decreased to the reference value to become smaller as an elapsed time from a time when the amount of light emission of the lighting device inside the vehicle cabin is changed as being higher than the reference value becomes longer.

2. The vehicle control system according to claim 1, wherein the environment control unit decreases the amount of light emission of the lighting device inside the vehicle cabin to the reference value or less at a timing that is before a time point at which the automatic driving control unit ends execution of the first driving mode and transitions to the second driving mode.

3. The vehicle control system according to claim 1, wherein the environment control unit decreases the amount of light emission of the lighting device to the reference value or less by gradually decreasing the amount of light emission of the lighting device inside the vehicle cabin from an amount of light emission that is higher than the reference value.

4. The vehicle control system according to claim 1, wherein the environment control unit temporarily increases the amount of light emission of the lighting device before decreasing the amount of light emission of the lighting device to the reference value or less.

5. The vehicle control system according to claim 1, wherein the environment device includes an air conditioner inside the vehicle cabin, wherein the environment control unit estimates fogging of a window of the subject vehicle, and wherein, in a case in which the automatic driving control unit ends execution of the first driving mode and transitions to the second driving mode, an operation of the air conditioner is started in a case in which the fogging of the window is estimated.

6. The vehicle control system according to claim 1, wherein the environment device includes a temperature adjusting unit that raises a temperature of a steering wheel inside the subject vehicle, and wherein, in a case in which the automatic driving control unit ends execution of the first driving mode and transitions to the second driving mode of which a degree of automatic driving is lower than that of the first driving mode, the environment control unit causes the temperature of the steering wheel to approach a predetermined temperature by controlling the temperature adjusting unit.

* * * * *